(12) United States Patent
Gordon

(10) Patent No.: US 10,250,919 B2
(45) Date of Patent: *Apr. 2, 2019

(54) METHOD AND SYSTEM FOR REMOTELY CONTROLLING CONSUMER ELECTRONIC DEVICES

(71) Applicant: Gracenote, Inc., Emeryville, CA (US)

(72) Inventor: Donald F. Gordon, Morgan Hills, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,566

(22) Filed: Jun. 5, 2017

(65) Prior Publication Data

US 2017/0280176 A1    Sep. 28, 2017

Related U.S. Application Data

(63) Continuation of application No. 15/292,705, filed on Oct. 13, 2016, now Pat. No. 9,706,233, which is a
(Continued)

(51) Int. Cl.
*H04N 21/234* (2011.01)
*H04N 21/2343* (2011.01)
(Continued)

(52) U.S. Cl.
CPC ... *H04N 21/23424* (2013.01); *H04N 7/17318* (2013.01); *H04N 21/20* (2013.01);
(Continued)

(58) Field of Classification Search
None
See application file for complete search history.

(56) References Cited

U.S. PATENT DOCUMENTS

| 6,240,555 B1 | 5/2001 | Shoff et al. |
| 7,813,552 B2 | 10/2010 | Paschalakis et al. |

(Continued)

FOREIGN PATENT DOCUMENTS

| WO | WO 2010/084713 A1 | 7/2010 |
| WO | WO 2010/103848 A1 | 9/2010 |

OTHER PUBLICATIONS

U.S. Appl. No. 14/659,971, Final Office Action dated Dec. 28, 2016, 14 pages.
(Continued)

*Primary Examiner* — Justin E Shepard
(74) *Attorney, Agent, or Firm* — McDonnell Boehnen Hulbert & Berghoff LLP

(57) ABSTRACT

A media system replaces content in a first sequence of media content. The media system presents the first sequence of media content to an end-user and generates a fingerprint of the sequence of media content. The fingerprint is for comparison with a plurality of reference fingerprints so as to identify the first sequence of media content and determine a reference position within the first sequence of media content. The media system sends a request for a replacement sequence of content to a content replacement system, and receives replacement media content selected based on the identified first sequence of media content. The media system presents the replacement media content to the end-user instead of the first sequence of media content. Presenting the replacement media content begins at a position in the first sequence of media content that is determined based on the reference position.

20 Claims, 18 Drawing Sheets

Related U.S. Application Data continuation of application No. 15/287,116, filed on Oct. 6, 2016, now Pat. No. 9,998,767, which is a continuation of application No. 14/659,971, filed on Mar. 17, 2015, now Pat. No. 9,992,518, which is a continuation of application No. 12/760,004, filed on Apr. 14, 2010, now Pat. No. 9,015,741.

(60) Provisional application No. 61/170,586, filed on Apr. 17, 2009, provisional application No. 61/293,798, filed on Jan. 11, 2010.

(51) Int. Cl.

| | |
|---|---|
| H04N 21/44 | (2011.01) |
| H04N 21/23 | (2011.01) |
| H04N 21/442 | (2011.01) |
| H04N 21/21 | (2011.01) |
| H04N 21/20 | (2011.01) |
| H04N 21/25 | (2011.01) |
| H04N 21/2543 | (2011.01) |
| H04N 21/24 | (2011.01) |
| H04N 7/173 | (2011.01) |
| H04N 21/258 | (2011.01) |
| H04N 21/81 | (2011.01) |
| H04N 21/2347 | (2011.01) |
| H04N 21/2668 | (2011.01) |
| H04N 21/4405 | (2011.01) |
| H04N 21/4722 | (2011.01) |
| H04N 21/235 | (2011.01) |

(52) U.S. Cl.
CPC ............ *H04N 21/21* (2013.01); *H04N 21/23* (2013.01); *H04N 21/234* (2013.01); *H04N 21/235* (2013.01); *H04N 21/2347* (2013.01); *H04N 21/23418* (2013.01); *H04N 21/23439* (2013.01); *H04N 21/24* (2013.01); *H04N 21/25* (2013.01); *H04N 21/251* (2013.01); *H04N 21/2543* (2013.01); *H04N 21/25883* (2013.01); *H04N 21/2668* (2013.01); *H04N 21/44* (2013.01); *H04N 21/442* (2013.01); *H04N 21/4405* (2013.01); *H04N 21/44008* (2013.01); *H04N 21/44016* (2013.01); *H04N 21/44204* (2013.01); *H04N 21/44213* (2013.01); *H04N 21/44222* (2013.01); *H04N 21/4722* (2013.01); *H04N 21/812* (2013.01)

(56) References Cited

U.S. PATENT DOCUMENTS

| | | | |
|---|---|---|---|
| 7,840,081 | B2 | 11/2010 | Paschalakis et al. |
| 8,312,486 | B1 | 11/2012 | Briggs et al. |
| 9,015,741 | B2 | 4/2015 | Gordon |
| 2002/0078441 | A1 | 6/2002 | Drake et al. |
| 2002/0078744 | A1 | 6/2002 | Gehman et al. |
| 2002/0129383 | A1 | 9/2002 | Wasilewski |
| 2003/0002638 | A1 | 1/2003 | Kaars |
| 2004/0189873 | A1 | 9/2004 | Konig et al. |
| 2004/0194130 | A1 | 9/2004 | Konig et al. |
| 2004/0237102 | A1 | 11/2004 | Konig et al. |
| 2005/0149968 | A1 | 7/2005 | Konig et al. |
| 2005/0172312 | A1 | 8/2005 | Lienhart et al. |
| 2005/0177847 | A1 | 8/2005 | Konig et al. |
| 2006/0053080 | A1 | 3/2006 | Edmonson et al. |
| 2006/0187358 | A1 | 8/2006 | Lienhart et al. |
| 2006/0248569 | A1 | 11/2006 | Lienhart et al. |
| 2006/0271947 | A1 | 11/2006 | Lienhart et al. |
| 2007/0238500 | A1 | 10/2007 | Hsiung |
| 2007/0255622 | A1 | 11/2007 | Swix et al. |
| 2008/0092158 | A1 | 4/2008 | Bhatnagar et al. |
| 2008/0127250 | A1 | 5/2008 | DaCosta |
| 2008/0226125 | A1 | 9/2008 | Van Leest |
| 2008/0240435 | A1 | 10/2008 | Celik et al. |
| 2008/0250453 | A1 | 10/2008 | Smith et al. |
| 2009/0006197 | A1 | 1/2009 | Marcuvitz |
| 2009/0031133 | A1 | 1/2009 | Bar-El |
| 2009/0077580 | A1 | 3/2009 | Konig et al. |
| 2009/0299843 | A1 | 12/2009 | Shkedi |
| 2010/0088716 | A1 | 4/2010 | Ellanti et al. |
| 2010/0153993 | A1 | 6/2010 | Konig et al. |
| 2010/0162359 | A1 | 6/2010 | Casey et al. |
| 2010/0266111 | A1 | 10/2010 | Crausaz et al. |
| 2010/0269128 | A1 | 10/2010 | Gordon |
| 2015/0195597 | A1 | 7/2015 | Gordon |
| 2017/0026697 | A1 | 1/2017 | Gordon |
| 2017/0034549 | A1 | 2/2017 | Gordon |

OTHER PUBLICATIONS

U.S. Appl. No. 12/760,004, Response filed Jul. 3, 2012 to Non-Final Office Action dated Apr. 5, 2012., 16 pages.
U.S. Appl. No. 12/760,004, Response filed Oct. 23, 2012 to Final Office Action dated Jul. 23, 2012, 16 pages.
U.S. Appl. No. 12/760,004, Final Office Action dated Jul. 23, 2012, 19 pages.
U.S. Appl. No. 12/760,004, Non-Final Office Action dated Apr. 5, 2012, 17 pages.
U.S. Appl. No. 12/760,004, Non-Final Office Action dated Jun. 2, 2014, 18 pages.
U.S. Appl. No. 12/760,004, Notice of Allowance dated Dec. 16, 2014, 7 pages.
U.S. Appl. No. 12/760,004, Response filed Sep. 2, 2014 to Non-Final Office Action dated Jun. 2, 2014, 15 pages.
U.S. Appl. No. 14/569,971, Final Office Action dated Nov. 27, 2015, 14 pages.
U.S. Appl. No. 14/569,971, Non-Final Office Action dated May 16, 2016, 14 pages.
U.S. Appl. No. 14/659,971, Non-Final Office Action dated Jun. 1, 2015, 12 pages.
U.S. Appl. No. 14/659,971, Preliminary Amendment filed Mar. 20, 2015, 8 pages.
U.S. Appl. No. 14/569,971, Response filed Mar. 28, 2016 to Final Office Action dated Nov. 27, 2015, 15 pages.
U.S. Appl. No. 14/569,971, Response filed Sep. 1, 2015 to Non-Final Office Action dated Jun. 1, 2015, 13 pages.
U.S. Appl. No. 14/569,971, Response filed Sep. 16, 2016 to Non-Final Office Action dated May 16, 2016, 12 pages.
U.S. Appl. No. 15/287,116, Preliminary Amendment filed Oct. 10, 2016, 7 pages.
Alattar, Adnan M., "Bridging Printed media and the Internet via Digimarc's Watermarking Technology," 5 page.
U.S. Appl. No. 14/659,971, Advisory Action dated Mar. 13, 2017, 4 pages.
U.S. Appl. No. 14/659,971, Response filed Feb. 28, 2017 to Final Office Action dated Dec. 28, 2016, 11 pages.
U.S. Appl. No. 15/292,705, Preliminary Amendment filed Oct. 14, 2016, 6 pages.
U.S. Appl. No. 15/292,705, Non-Final Office Action dated Jan. 25, 2017, 7 pages.
U.S. Appl. No. 15/292,705, Notice of Allowance dated Mar. 16, 2017, 5 pages.
U.S. Appl. No. 15/292,705, Response filed Feb. 10, 2017 to Non-Final Office Action dated Jan. 25, 2017.

METHOD AND SYSTEM FOR REMOTELY CONTROLLING CONSUMER ELECTRONIC DEVICES

RELATED APPLICATIONS

This application is a continuation of U.S. patent application Ser. No. 15/292,705, filed Oct. 6, 2016, which is a continuation of U.S. patent application Ser. No. 15/287,116, filed Oct. 6, 2016, which application is a continuation of U.S. patent application Ser. No. 14/659,971, filed Mar. 17, 2015, which is a continuation of U.S. patent application Ser. No. 12/760,004, filed Apr. 14, 2010, which claims the benefit of the following U.S. Provisional Patent Applications all of which are incorporated by reference herein in their entirety: U.S. Provisional Patent Application No. 61/170,586, filed Apr. 17, 2009, entitled "Method and System for Remotely Controlling Media Systems"; and U.S. Provisional Patent Application No. 61/293,798, filed Jan. 11, 2010, entitled "Method and System for Remotely Controlling Consumer Electronic Devices".

TECHNICAL FIELD

The disclosed embodiments relate generally to remotely controlling a media system, and more particularly to directing a media system to perform specific actions, such as replacing an original sequence of media content (e.g., a non-targeted advertisement in a television broadcast) with replacement media content (e.g., a targeted advertisement).

BACKGROUND

In recent years, the replacement of television advertisements with targeted television advertisements has become an increasingly important advertising method. Content providers such as television networks routinely insert generic advertisements into streamed network television content. For example, a content provider (e.g., a national cable television network such as ESPN) provides a network feed that contains embedded interstitial advertisements to content distributors (e.g., a cable affiliates such as Comcast, Time Warner Cable). Such advertisements routinely include advertisements for credit cards, national retailers or other products with broad appeal. A content distributor or a content provider may, want to be able to substitute a replacement advertisement for the advertisement inserted in the broadcast feed. Merely substituting in a replacement advertisement for local businesses, such as a car dealership or a real estate agent does not provide sufficient targeting for the advertisements. While the advertisement is local it still may have no relevancy to an individual viewer. Thus, conventional methods of providing replacement content (e.g., inserting targeted advertisements) fail to provide sufficiently sophisticated and accurate targeting of replacement media content while maintaining the simplicity of media systems. Rather, it would be valuable to advertisers and thus to content providers to be able to insert highly targeted advertisements based on other specific information about the likely viewer of the advertisement.

SUMMARY

The above deficiencies and other problems associated with conventional methods of targeting replacement content are addressed by the disclosed system and method for remotely controlling a consumer electronic device. In accordance with one embodiment, the distribution system disclosed herein supports content replacement through a communication network that is distinct from the primary communication network used to provide the original media content to replace television advertising content, without the need for complex replacement media content targeting systems at the media system. Original media content (e.g., advertisements included in a television network feed) is provided through a communication network (e.g., a managed satellite television network). The original media content is overwritten with replacement media content (e.g., targeted advertisements) delivered via an alternative communication network (e.g., an unmanaged network such as the Internet).

In accordance with some embodiments, a media system receives a first sequence of media content from a media content distributor over a first communication network, the first sequence of media content including associated control data for facilitating the replacement of the first content with replacement content. The media system presents the first sequence of media content to an end-user of the media system. While presenting the content to the end-user, the media system detects associated control data. In response to detecting the control data, sending a request to a content replacement system over a second communication network that is distinct from the first communication network. The media system receives a response to the request, the response including the replacement media content; and presents the replacement media content to the end-user of the media system instead of the first sequence of media content.

In accordance with some embodiments, the media system is a consumer electronic device of the end-user. In some embodiments, the first sequence of media content is a sequence of video content including video content requested by the end-user and advertisement video content and the replacement media content is a sequence of video content including one or more replacement advertisements. In some embodiments, the control data is embedded in the original sequence of media content and concealed from detection. In some embodiments, the control data is concealed from detection using steganographic techniques.

In some embodiments, the replacement media content is selected at the content replacement system in accordance with predefined criteria. In some embodiments, the first sequence of media content is an advertisement on a television channel; the replacement media content is a targeted advertisement; and the targeted advertisement is selected based at least in part on demographic, psychographic or behavioral information of the end-user of the media system. In some embodiments, while presenting the replacement media content to the end-user, the media system receives a request for a second sequence of media content, and in response to the request for the second sequence of media content, the media system ceases to present the replacement media content; and presents the second sequence of media content to the end-user.

In some embodiments, while presenting the second sequence of media content to the end-user, the media system continues to advance the replacement media content, receives a request for the first sequence of media content; and in response to the request for the first sequence of media content, the media system performs an operation. If the replacement media content is still advancing, the media system presents the replacement media content. If the replacement media content has reached an end of the replacement media content, the media system presents the first sequence of media content to the end-user.

In some embodiments, the predefined criteria include information about the end-user of the media system. In some embodiments the information about the end-user of the media system is provided by at least one of the list comprising: a content provider, a content distributor; a manufacturer of the media system and a service provider to the end-user of the media system. In some embodiments, the predefined criteria includes information about a provider of the replacement media content, including at least one of the list comprising: advertiser identifier, campaign identifier. In some embodiments the control data includes one or more of the following: an advertiser identifier, an advertisement campaign identifier, advertisement duration, advertisement pre-roll period or advertisement start time, current date and time.

In some embodiments, receiving the first sequence of media content includes receiving one or more television channels over a managed data network from a content distributor, the content distributor including at least one of: a satellite network, radio frequency broadcast network, internet protocol television provider, and a cable network.

In some embodiments, sending the request to the content replacement system includes sending the request over an unmanaged data network (e.g., the Internet).

In some embodiments, receiving replacement media content includes receiving the replacement media content as a stream over an unmanaged data network.

In some embodiments, the replacement media content has an end, and the method further comprises, the media system detecting the end of the replacement media content while presenting the first sequence of media content; ceasing to present the replacement media content; and presenting the first sequence of media content. In some embodiments, in response to presenting the replacement media content, the media system sends usage data to the content replacement system for delivery to a provider of the replacement media content.

In some embodiments, the method described above is implemented on a media system comprising: one or more processors, memory, a display, and one or more programs stored in the memory, the one or more programs comprising instructions to perform the various methods described above.

In some embodiments, the method described above is implemented on a media system comprising: a computer readable storage medium storing one or more programs configured for execution by a computer, the one or more programs comprising instructions to perform the various methods described above.

In one embodiment the media system receives media content including steganographic control data embedded into the media content. While preparing to present the media content on the media system, the media system detects the steganographic control data, extracts the steganographic control data from the content; and, in response to detecting the steganographic control data, triggers an action at the media system based at least in part on the control data.

In accordance with some embodiments, the media system is a consumer electronic device of the end-user. In some embodiments, triggering the action at the media system includes sending a request to a content replacement system, the request including at least a subset of the control data, and the method further includes: receiving replacement media content from the content replacement system; and presenting the replacement media content on the media system. In some embodiments, prior to triggering the action, the media system presents the media content on the media system.

In some embodiments, the presented media content is modified based at least in part on the control data; and presenting the modified media content on the media system. In some embodiments, the steganographic control data is encrypted. In some embodiments, the media system modifies the presented content by replacing the presented content with replacement media content. In some embodiments the triggering action includes presenting an interactive element in conjunction with presenting the media content on the media system. In some embodiments, triggering the action includes beginning to run an application on the media system.

In some embodiments, the method described above is implemented on a media system comprising: one or more processors, memory, a display, and one or more programs stored in the memory, the one or more programs comprising instructions to perform the various methods described above.

In some embodiments, the method described above is implemented on a media system comprising: a computer readable storage medium storing one or more programs configured for execution by a computer, the one or more programs comprising instructions to perform the various methods described above.

In accordance with some embodiments, a media system receives a first sequence of media content from a media content distributor over a first communication network. The media system presents the first sequence of media content to an end-user of the media system and generates a fingerprint of the sequence of media content. The fingerprint is for comparison with a plurality of reference fingerprints so as to identify the first sequence of media content and determine a reference position within the first sequence of media content. The media system sends a request for a replacement sequence of content to a content replacement system over a second communication network that is distinct from the first communication network. The request is based at least in part on the fingerprint. The media system receives a response to the request, the response including the replacement media content. The replacement media content is selected based at least in part on the identified first sequence of media content. The media system presents the replacement media content to the end-user of the media system instead of the first sequence of media content. The media system presents the replacement media content and begins at a position in the first sequence of media content that is determined based at least in part on the reference position.

In accordance with some embodiments, the media system is a consumer electronic device of the end-user. In some embodiments, the plurality of reference fingerprints are predetermined fingerprints. In some embodiments, the first sequence of media content is a sequence of video content including video content requested by the end-user and advertisement video content; and the replacement media content is a sequence of video content including one or more replacement advertisements. In some embodiments, identifying the first sequence of media content includes identifying a channel and a timestamp for the first sequence of media content.

In some embodiments, prior to generating the fingerprint, the media system receives, from the content replacement system, at least a subset of the reference fingerprints selected from the plurality of reference fingerprints; and after generating the fingerprint, the media system compares the fingerprint to respective reference fingerprints of the subset of reference fingerprints; and: if a respective reference fingerprint of the subset of reference fingerprints matches the fingerprint, the request for a replacement sequence of content includes data indicating that the fingerprint matches the respective reference fingerprint; and if the fingerprint does not match any of the respective reference fingerprints of the subset of reference fingerprints, the request for a replacement sequence of content includes the fingerprint, for comparison with additional reference fingerprints at the content replacement system.

In some embodiments, the subset of reference fingerprints are selected from the plurality of reference fingerprints based on usage data. In some embodiments, the fingerprint is determined using luminance sampling. In some embodiments, the fingerprint is determined based on values sampled from multiple predefined positions in a single frame in the sequence of media content. In some embodiments, the fingerprint is determined based on values sampled from a predefined position in a plurality of sequentially displayed frames in the sequence of media content.

In some embodiments, the first sequence of media content is an advertisement on a television channel; the replacement media content is targeted advertisement; and the targeted advertisement is selected based at least in part on information selected from the list consisting of: demographic, psychographic, and behavioral information of the end-user of the media system.

In some embodiments, while presenting the replacement media content to the end-user, the media system receives a request for a second sequence of media content; and in response to the request for the second sequence of media content: the media system ceases to present the replacement media content; and presents the second sequence of media content to the end-user. In some embodiments, while presenting the second sequence of media content to the end-user: the media system continues to advance the replacement media content; receives a request for the first sequence of media content; and, in response to the request for the first sequence of media content: if the replacement media content is still advancing, the media system presents the replacement media content; and if the replacement media content has reached an end of the replacement media content, the media system presents the first sequence of media content to the end-user.

In some embodiments, the replacement media content is selected at the content replacement system in accordance with predefined criteria. In some embodiments, the predefined criteria includes information about a provider of the replacement media content, including information selected from the list consisting of: advertiser identifier, and campaign identifier. In some embodiments, the predefined criteria includes information about the end-user of the media system. In some embodiments, the information about the end-user of the media system is provided by an entity selected from the list consisting of: a content provider, a content distributor; a manufacturer of the media system, and a service provider to the end-user of the media system.

In some embodiments, receiving the first sequence of media content includes receiving one or more television channels over a managed data network from a content distributor, the content distributor including an entity selected from the list consisting of: a satellite network, radio frequency broadcast network, internet protocol television provider, and a cable network. In some embodiments, sending the request to the content replacement system includes sending the request over an unmanaged data network. In some embodiments, receiving replacement media content includes receiving the replacement media content as a stream over an unmanaged data network.

In some embodiments, the replacement media content has an end. In these embodiments, the device detects the end of the replacement media content while presenting the replacement media content, ceases to present the replacement media content, and presents the first sequence of media content.

In some embodiments, the method described above is implemented on a media system comprising: one or more processors, memory, a display, and one or more programs stored in the memory, the one or more programs comprising instructions to perform the various methods described above.

In some embodiments, the method described above is implemented on a media system comprising: a computer readable storage medium storing one or more programs configured for execution by a computer, the one or more programs comprising instructions to perform the various methods described above.

Thus, the system and methods described herein provide means for replacing (e.g., accurately targeting) a first sequence of media content with replacement media content on media systems (e.g., consumer electronic device) without unnecessarily increasing the complexity, size and cost of the media system. Additionally, this approach allows for the real time coordination between the content providers (e.g., television networks), media systems (e.g., televisions) and the content replacement system (e.g., the targeted advertisement serving infrastructure) that is accessible over the second communication network (e.g., an IP network such as the Internet). The use of control data in this fashion allows the systems core logic to be located at a content replacement system, rather than the media system, thereby reducing media system manufacturing cost and complexity. As the number of media systems in a television network far exceeds the number of content replacement systems, this savings can be considerable. Thus, while preserving the media systems accurately, targeted replacement sequences of media content can still be delivered to the media system in real-time.

Additionally, in some embodiments the system and method described herein provide an improvement over conventional content replacement methods by 1) using control data delivered with media content over a first communication network to initiate activity over a second communication network, and 2) serving replacement media content (e.g., video, graphics, applications, images, text, etc.,) from the second communication network solely in response to the control data received over the first communication network. Therefore, the disclosed system and method simultaneously provide more valuable replacement content while keeping media system manufacturing costs to a minimum by allowing storage, logic, and processing to reside in an alternate network.

Similarly the problems of embedded control data stripping are reduced or eliminated through the use of steganographic control data. By using steganographic control data to indicate a media content replacement opportunity, the problem of control data stripping by third parties (e.g., a cable television company, an internet protocol television provider, a satellite network, a web video provider, a mobile video provider, etc.) is reduced or eliminated. Thus, the use of steganographic control data in accordance with some embodiments ensures the viability and integrity of the replacement media content targeting process.

Additionally, in some embodiments the system and method described herein provide an improvement over conventional content replacement methods by generating fingerprint of media content received over a first communication network, such as a cable television network, and comparing the generated fingerprints with predetermined reference fingerprints received over a second communication network, such as the Internet, to initiate activity over the second communication network. Therefore, the disclosed system and method simultaneously provide replacement content, such as targeted advertisements, that is more valuable than the media content received over the first communication network, such as non-targeted advertisements, while avoiding both: (1) problems caused by entities who remove or strip embedded data from the media content, and (2) the violation of any agreements prohibiting the transmission of data in the media content.

BRIEF DESCRIPTION OF THE DRAWINGS

Like reference numerals refer to corresponding parts throughout the drawings.

DESCRIPTION OF EMBODIMENTS

The apparatus and methods disclosed herein supplement the ordinary provision of a sequence of media content (e.g., one or more television feeds, streams or channels) to a media system (e.g., a television). As used herein, a sequence of media content is any media content (e.g., audio, video, image or text) that is dynamically presented (e.g., changes with time) by a media system. For example, a single television (or radio) advertisement is a sequence of media content. Likewise, a television show with embedded interstitial advertisements is a sequence of media content. In accordance with some embodiments, the replacement of a sequence of media content includes replacing an entire sequence of media content (e.g., replacing an entire television advertisement). In accordance with some embodiments, the replacement of a sequence of media content includes replacing a portion of a sequence of media content (e.g., replacing a single embedded interstitial advertisement in a television show). Similarly, "media content" or "replacement media content" may be used to refer to a single sequence of media content (e.g., a single advertisement or segment of a television show that is not interrupted by other interstitial advertisements).

The relevant functional components may be implemented using standard and/or custom computer hardware and/or software (e.g., a cable set-top box) in combination with software, and may be provided by the content provider (e.g., television network) the content distributor (e.g., local network affiliate) or by a contractor or vendor hired to perform the relevant function. In accordance with some embodiments a content provider is a computer system which assembles media content into a sequence of media content (e.g., a broadcast network feed). In accordance with some embodiments a content distributor is a computer system which receives the sequence of media content (optionally modifying the sequence of media content) and distributes the sequence of media content to a plurality of media systems (e.g., a cable box in a cable customer's home).

Functional components used to facilitate operation of a content provider, content distributor, media system or content replacement system that are not otherwise relevant to embodiments of this invention are omitted for clarity. As used herein, video signals include either: 1) both audio and a video signals, 2) video signals alone. In accordance with some embodiments, media content includes a transmission that includes only an audio signal (e.g., a radio signal). The distribution system disclosed herein supports the insertion of one or more replacement sequences of media content (e.g., an advertisement or a series of advertisements) into one or more original sequences of media content (e.g., a broadcast television feed), across unmanaged networks (e.g., the Internet) without the need for complex delivery, arbitraging, or switching systems at the media system.

Figure 1:
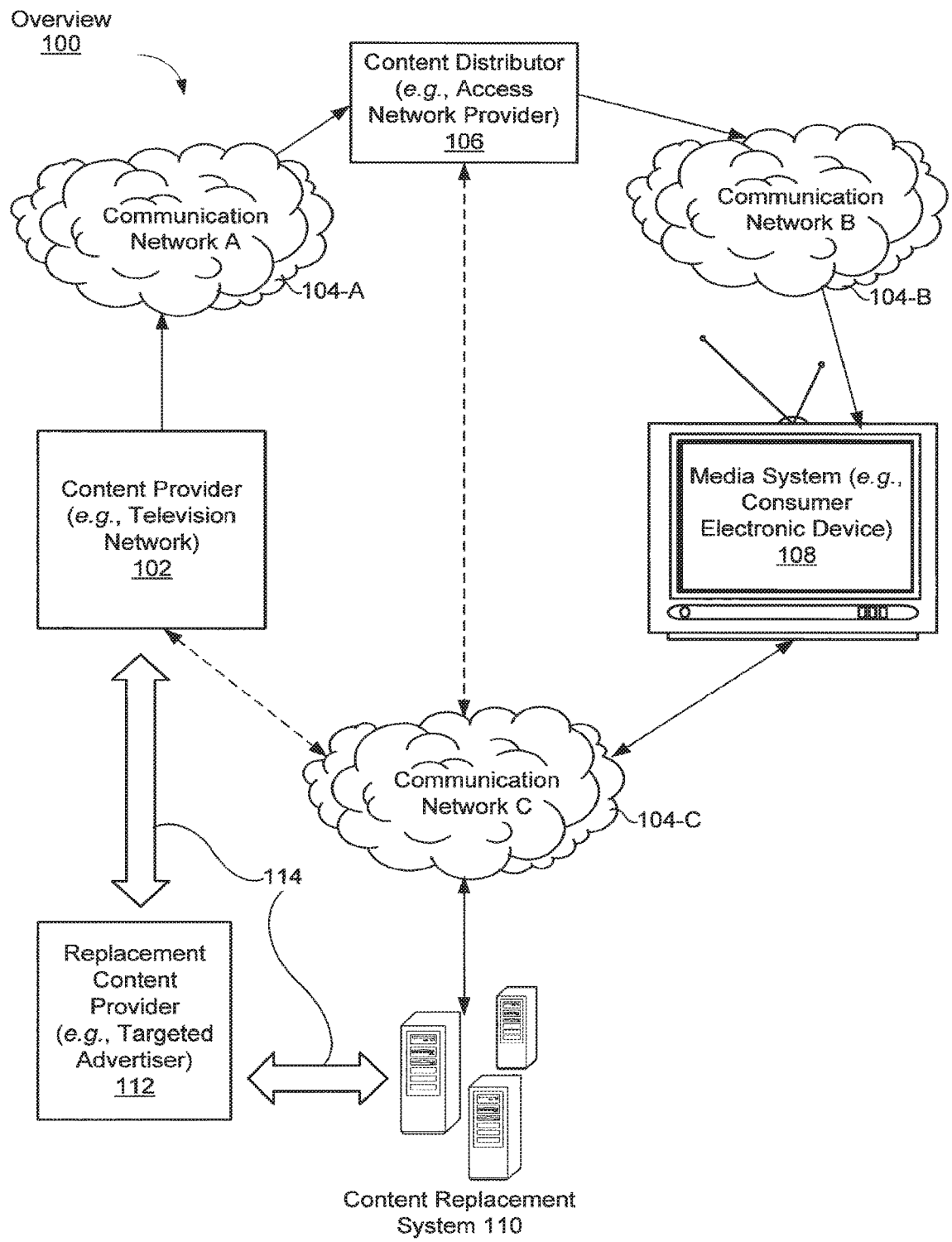
FIG. 1 is a block diagram of a distributed system for providing media content to a media device in accordance with some embodiments.

Attention is now directed to FIG. 1, which illustrates an overview 100 of a distributed system for providing media content to a media device in accordance with some embodiments. The Distributed System 100 includes at least: a Content Provider 102, a Content Distributor 106, a Media System 108, a Content Replacement System 110 and a Replacement Content Provider 112. These components are linked together through one or more communication networks 104-A, 104-B, 104-C (e.g., the Internet, other wide area networks, local area network, managed content distribution network, etc.) so that the various components can communicate with each other.

The Content Provider 102 (e.g., a television network or radio network) is any party that has access to and provides source media content (e.g., movies, television shows, video advertisements, radio shows, music). The Content Provider 102 creates one or more sequences of media content (e.g., television streams, feeds or channels) and provides these sequences of media content through communication network A 104-A to the Content Distributor 106 (e.g., a network access provider). In some embodiments, communication network A 104-A is a dedicated communication channel (e.g., a satellite link or a fiber optic data link). In some embodiments the Content Provider 102 and the Content Distributor 106 are combined, under the control of the same entity or otherwise closely related. In this embodiment, the communication network A 104-A could be any type of data link connecting a content source such as a video-on-demand server or locally originated programming, represented in the Distributed System 100 as the Content Provider 102, and the Content Distributor 106.

The Content Distributor 106 is any party that distributes sequences of media content received from the Content Provider 102 through communication network B 104-B to a Media System 108. In some embodiments the Content Distributor 106 modifies the one or more sequences of media content and provides the modified content to the Media System 108. In some embodiments, communication network B is a managed network (e.g., a cable television network having cable trunks and branch nodes, an internet protocol television network, a network of satellites and ground stations, a wide area computer network, a radio frequency broadcast network with broadcast towers, a satellite distribution network, or the Internet.) As one example, the Content Distributor 106 is a cable company and it receives an ESPN feed from the content provider, substitutes a replacement advertisement for a local real estate agent for an original advertisement in the ESPN feed and then distributes the television channel to a set-top box in the Media System 108.

The Media System 108 is connected both to communication network B 104-B and communication network C 104-C. In accordance with some embodiments, communication network C 104-C is an unmanaged network (e.g., the Internet). In some embodiments the Media System 108 is configured to communicate through communication network C 104-C with a Content Replacement System 110. In response to communications from the Media System 108, the Content Replacement System 110 provides replacement sequences of media content to replace at least a portion of the sequence of media content provided by the Content Distributor 106.

Either the Content Provider 102 or the Content Distributor 106 or both are connected to the Content Replacement System 110 through communication network C. The Content Provider 102 and/or the Content Distributor 106 share data with the Content Replacement System 110 to coordinate media content replacement and, in some embodiments, to share usage data. The Content Provider 102, Content Distributor 106, and or the Content Replacement System 110 have relationships 114 with the Replacement Content Provider 112 (e.g., targeted advertiser). The Replacement Content Provider 112 provides the Content Replacement System 110 with replacement content, and in some embodiments provides the Content Provider 102 and the Content Distributor 106 with an original sequence of media content (e.g., an untargeted advertisement) that is replaced with the replacement media content (e.g., a sequence of media content such as a targeted advertisement). In accordance with some embodiments, Replacement Content Provider 112 includes a plurality of distinct content providers (e.g., advertisers or other entities who create and/or provide replacement media content). In accordance with some embodiments, the Content Provider 102 and the Replacement Content Provider 112 are under the control of the same entity or otherwise closely related (e.g., owned by the same corporation). In this embodiment, the communication network C 104-C is used to communicate or otherwise transfer the Content Replacement System 110 to the Replacement Content Provider 112.

For example, a car manufacturer pays for a television station to insert an advertisement for a minivan into an advertisement slot during a television show. In this example, the car manufacturer also provides a targeted advertisement for a convertible to an advertisement replacement system to be substituted for the minivan advertisement only when displaying the advertisement to television viewers between the ages of 18 and 25. In this example the Replacement Content Provider 112 (e.g., the car manufacturer) provides the original media content (e.g., minivan advertisement) to the Content Provider 102 and the replacement content (e.g., targeted convertible advertisement) to the Content Replacement System 110. When the minivan advertisement is about to be played on a television owned by a 20 year old, the Content Replacement System 110 replaces the advertisement for the minivan with the advertisement for the convertible car and reports the replacement to the advertiser. In some embodiments the Replacement Content Provider 112 also has a relationship with the Content Distributor 106 similar to its relationship with the Content Provider 102.

It should be understood that the communication networks have been divided merely for convenience. In one embodiment, the communication network C 104-C is distinct from communication network B 104-B, and communication network C 104-C is the internet and communication network-B is a managed network (e.g., a cable network). In an alternate embodiment communication network C 104-C is the same as communication network B 104-B, and the Content Replacement System 110 is located at the Content Distributor 106. Additionally, in some embodiments the Content Replacement System 110 is combined with the Content Provider 102 or the Content Distributor 106. In some embodiments, the Content Distributor 106 is the Internet. In some embodiments, the communication network C is the Internet, a local area network (LAN), or a wide area network (WAN), or a different content distributor. Embodiments of the invention disclosed herein may use various alternative distribution networks known in the art. In some embodiments, various ones of the previously described components are connected to one or more of the communication networks 104 using cables such as wires, optical fibers and other transmission mediums. In other embodiments, one or more of these components are connected to one or more of the communication networks 104 through one or more wireless networks using radio signals, satellite links, or the like.

The Media System 106 (sometimes called the "client device," "client computing device," or "client computer") may be any computer, television, radio, set-top box, decoder, or similar device that is capable of receiving the sequences of media content, and preparing the sequences of media content (e.g., audio or video) for display to an end-user. Examples of suitable Media Systems 106 include, without limitation, desktop computers, notebook computers, tablet computers, mobile devices such as mobile phones and personal digital assistants, direct to home satellite receivers, radios, set-top boxes, and televisions.

In some embodiments, the one or more Content Replacement Systems 110 is a computer server. In other embodiments the Content Replacement Systems 110 include a plurality of servers such as a web interface (front end server) one or more application servers and one or more database servers which are connected to each other through a network (e.g., a LAN, WAN or the like), and which exchange information with other components of the distributed system described above through a common interface (e.g., one or more web servers, also called front end servers). In some other embodiments, the front end server and the back end server are merged into one software application and/or hosted on one physical server.

It should be understood that, in accordance with some embodiments, the one or more Content Replacement Systems 110 may include a plurality of distinct content replacement systems. In some embodiments each of the distinct content replacement systems provides content replacement services to a distinct class of media systems (e.g., one content replacement system provides replacement content for mobile devices, while a second content replacement system provides replacement content for televisions). In some embodiments each of the distinct content replacement systems provides content replacement services associated with a distinct content provider or content distributor (e.g., one content replacement system provides content for ESPN and one content replacement system replaces content for HBO).

Figure 2:
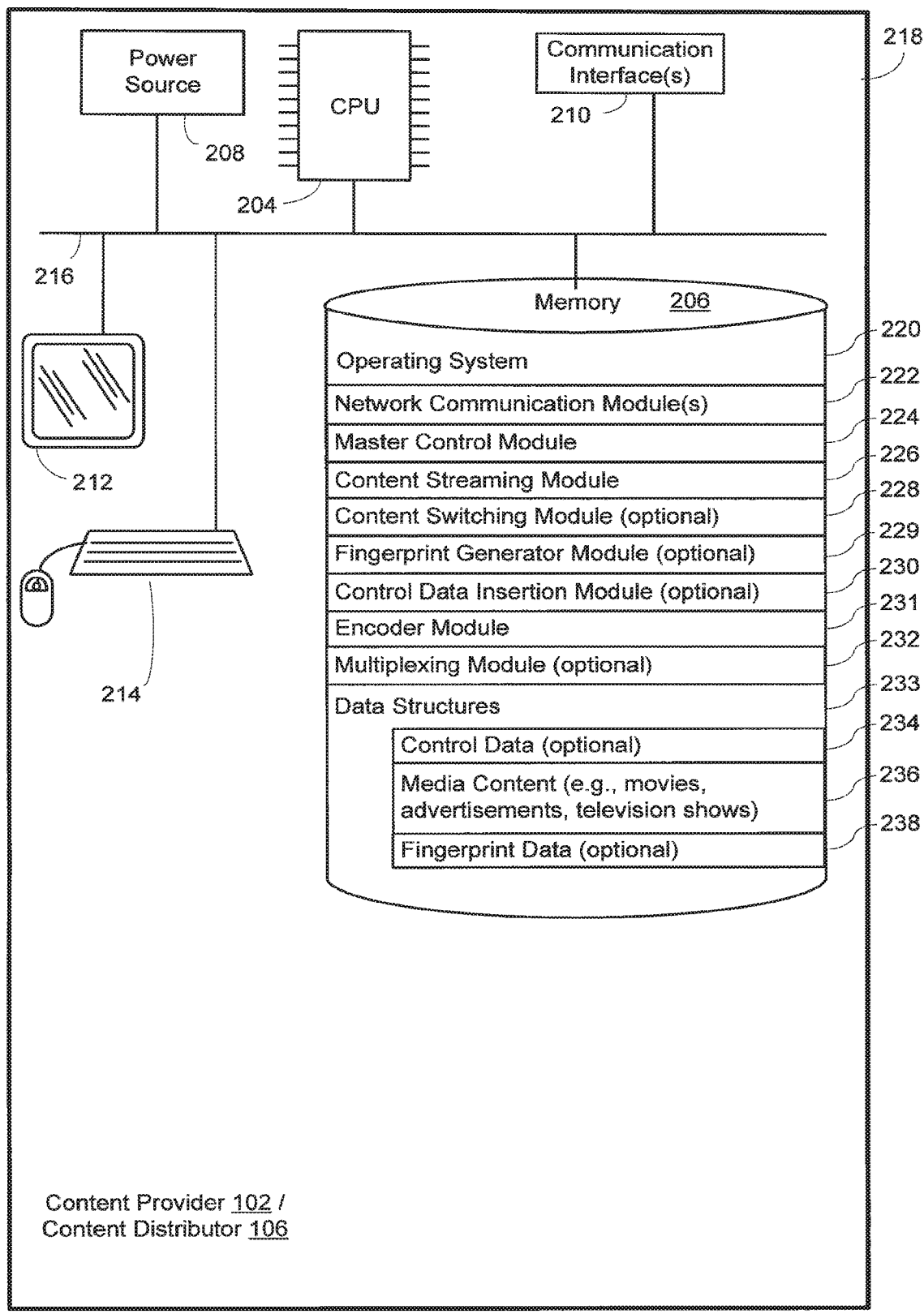
FIG. 2 is a block diagram of a content provider or a content distributor in accordance with some embodiments.

FIG. 2 is a block diagram illustrating a Content Provider System 102 or Content Distributor System 106 in accordance with one embodiment. The Content Provider 102 or Content Distributor 106 typically includes one or more processing units (e.g., CPUs) 204, one or more power sources 208, one or more network or other communications interfaces 210 (e.g., a coaxial cable port, an Ethernet port, and/or a wireless port), memory 206, one or more communication buses 216 for interconnecting these components, and a housing 218. The Content Provider 102 or Content Distributor 106 optionally may include a user interface comprising a display device 212 and a keyboard 214. The memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 204. The memory 206, or alternately the non-volatile memory device(s) within memory 206, comprises a computer readable storage medium. In some embodiments, memory 206 or the computer readable storage medium of memory 206 stores the following programs, modules and data structures, or any subset thereof:

- An operating system 220 that includes procedures for handling various basic system services and for performing hardware dependent tasks.
- One or more network communication module(s) 222 that are used for connecting the Content Provider 102 or the Content Distributor 106 to other computers via the communication network interface(s) 210 (wired or wireless) to one or more communication networks, such as the Internet, other wide area networks, local area networks, metropolitan area networks, satellite links, cable networks, and so on. For a Content Provider 102, the network communication module(s) 222 connect the Content Provider 102 to the Content Distributor 106 through communication network A (104-A in FIG. 1), and the Content Replacement System 110 through communication network C (104-C in FIG. 1). For a Content Distributor 106, the network communication module(s) 222 connect the Content Distributor 106 to communication network A (104-A in FIG. 1), communication network B (104-B in FIG. 1) and communication network C (104-C in FIG. 1). It should be understood that each of the plurality of network communication modules 222 may have a separate communication interface (e.g., an Ethernet port, a cell phone antenna, and a cable port), or two or more of the network communication modules 222 may share a communication interface.
- A master control module 224 that creates and/or modifies a sequence of media content by combining and/or reordering media content from one or more sources by controlling a content streaming module 226, a content switching module 228, and/or a control data insertion module 230.
- One or more content streaming modules 226 for retrieving content (e.g., movies, television shows and advertisements) from one or more sources including remotely located content providers and local data structures 234.
- A content switching module 228 (optional) for switching between a plurality of content streaming modules 226 (e.g., to switch between a primary content stream containing a movie and a secondary content stream containing an advertisement).
- A fingerprint generator module 229 (optional) for generating fingerprints of the media content for use by the Content Replacement System 110 and the Media System 108 to identify media content to replace.
- A control data insertion module 230 (optional) for inserting control data into the stream of media content (e.g., by adding steganographic data to the stream of media content), the control data including one or more of: an advertiser identifier, an advertisement campaign identifier, advertisement duration, advertisement pre-roll period or advertisement start time, current date and time, and/or a unique identifier.
- An encoder module 231 for encoding sequences of media content transferred from the Content Provider 102 to the Content Distributor 106 and encoding sequences of media content transferred to the Media System 108 from the Content Distributor 106 and/or the Content Provider 102.
- A multiplexer 232 (optional) for multiplexing and/or demultiplexing a plurality of sequences of media content.
- Data structures 233 for storing control data 234 (optional) for use by the control data insertion module 230, media content 236 (e.g., movies, advertisements, television shows), and fingerprint data 238 (optional) including the fingerprints generated by the fingerprint generator module 229.

Each of the above identified programs, modules and/or data structures may be stored in one or more of the previously mentioned memory devices, and corresponds to a set of instructions for performing the functions described above. The above identified modules or programs (i.e., sets of instructions) need not be implemented as separate software programs, procedures or modules, and thus various subsets of these modules may be combined or otherwise re-arranged in various embodiments. In some embodiments, the memory 206 may store a subset of the modules and data structures identified above. Furthermore, the memory 206 may store additional modules and data structures not described above. Similarly, while the above identified memory devices are shown in a single computing device in a single housing, it should be understood that each of the modules could be implemented on a separate hardware device (e.g., the master control module could be a separate master control server and the content streamer module could be a separate content streaming server).

Additionally, discussion of the Content Provider 102 and the Content Distributor 106 has been consolidated into a single section for the sake of clarity. However, one having ordinary skill in the art would readily understand that, in some embodiments, the Content Distributor 106 is distinct from the Content Provider 102 in that the Content Provider 102 creates an initial sequence of media content, which is then provided directly to the Content Distributor 106. The Content Distributor 106 receives the sequence of media content from the Content Provider 102 and, in some embodiments modifies the sequence of media content by adding or replacing advertisements and then distributes the content to the Media System 108 (e.g., a consumer electronic device) for presentation to an end-user of the Media System 108. Alternatively, in some embodiments, the Content Provider 102 and the Content Distributor 106 are combined into a single content provider/distributor which acquires source media content and delivers it directly to the Media System 108.

Figure 3:
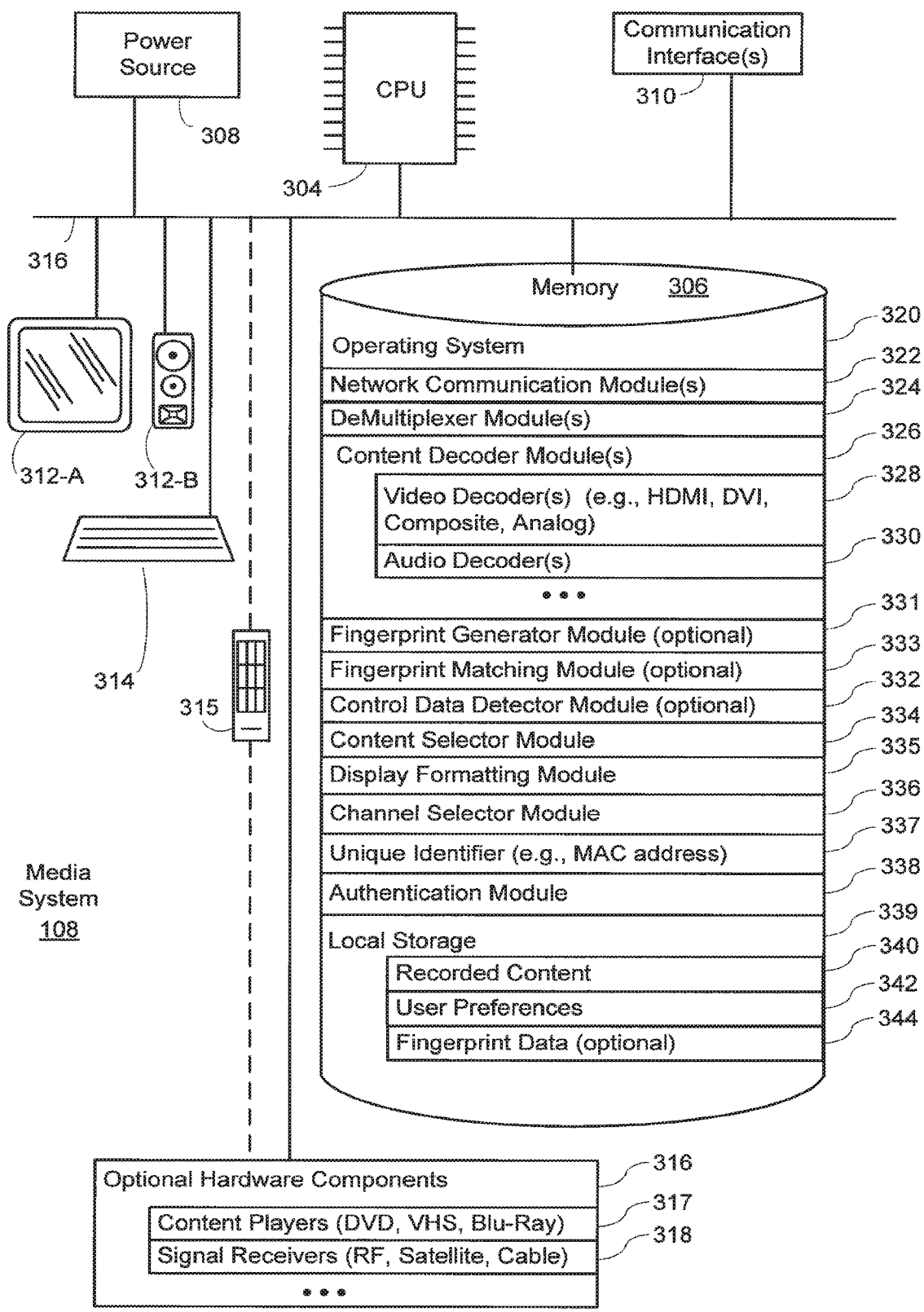
FIG. 3 is a block diagram of a media system for presenting media content in accordance with some embodiments.
Figure 5:
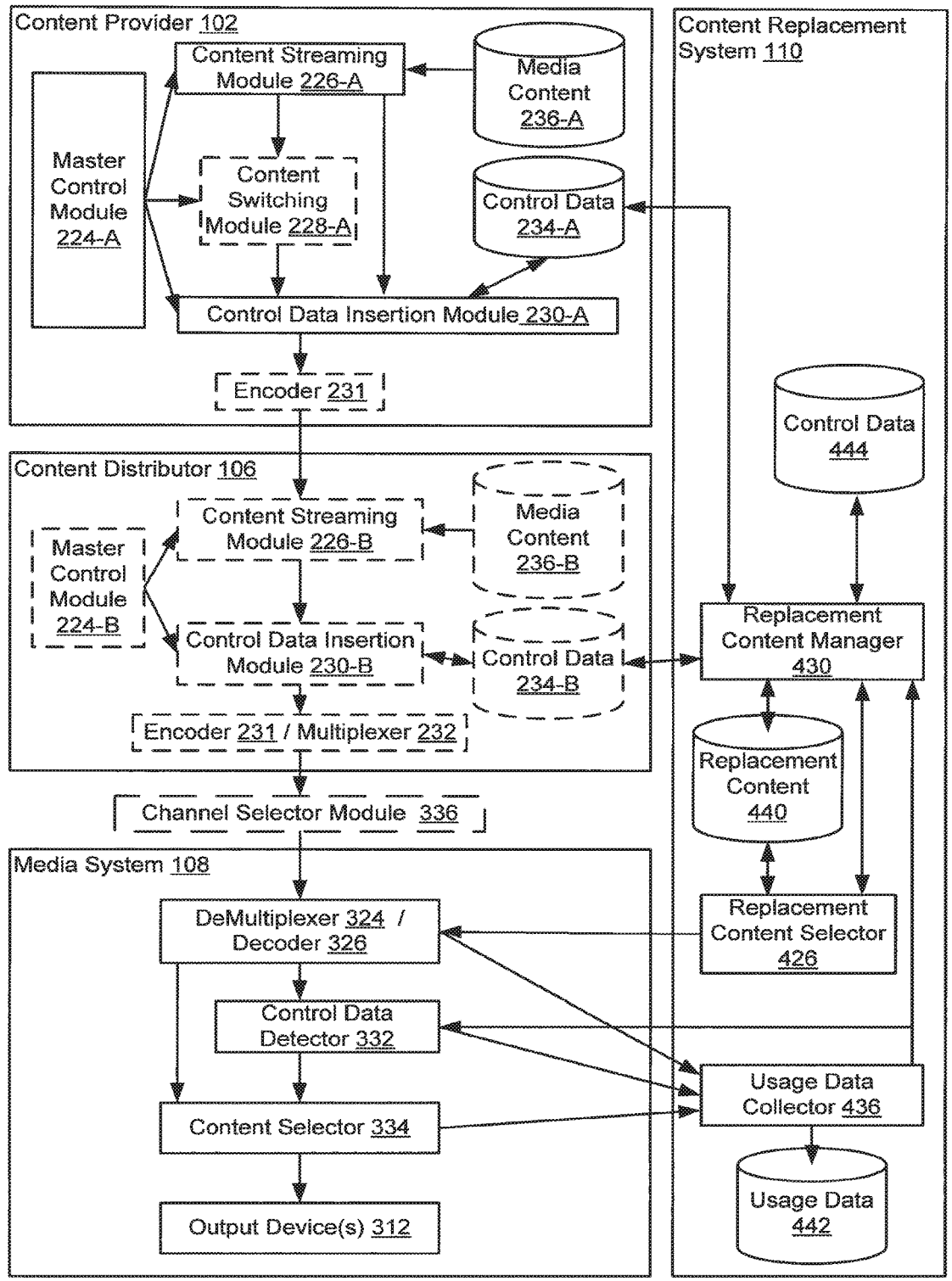
FIG. 5 is a block diagram illustrating the flow of data through a distributed system for distributing media content to a media system using embedded control data in accordance with some embodiments.
Figure 6A:
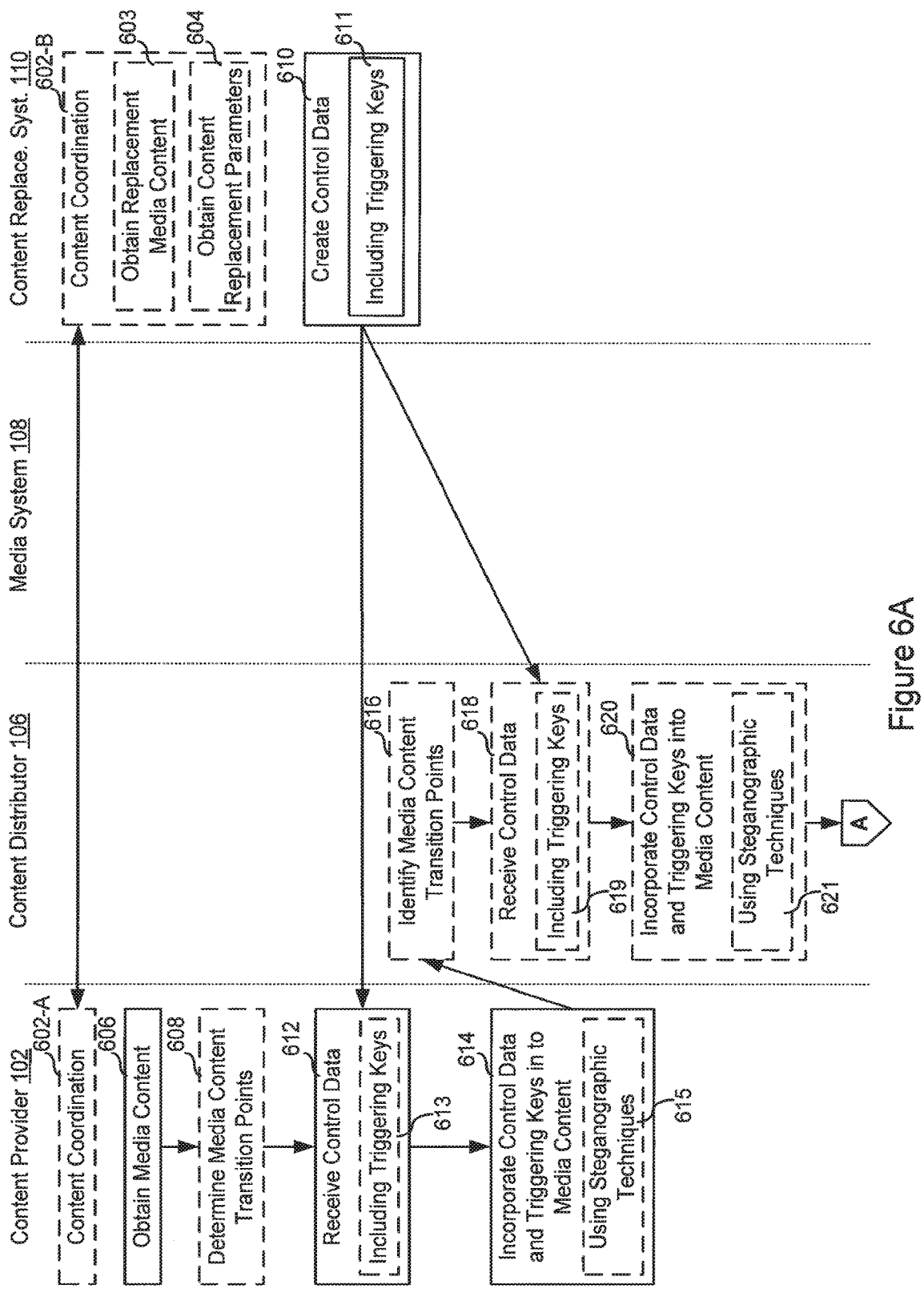
FIG. 6A-6E include a flow diagram of a process for remotely controlling media systems using embedded control data in accordance with some embodiments.
Figure 6B:
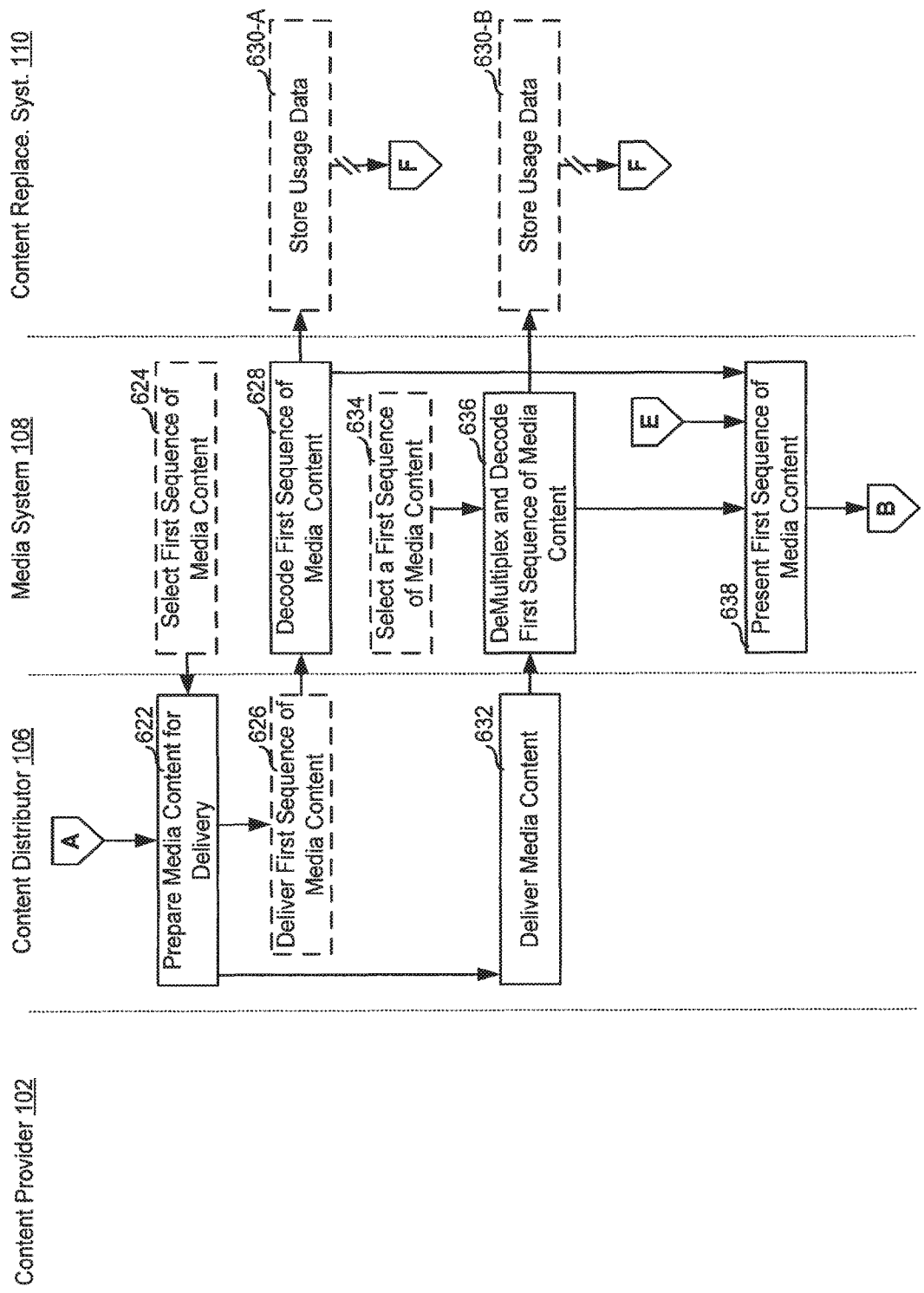
Figure 6C:
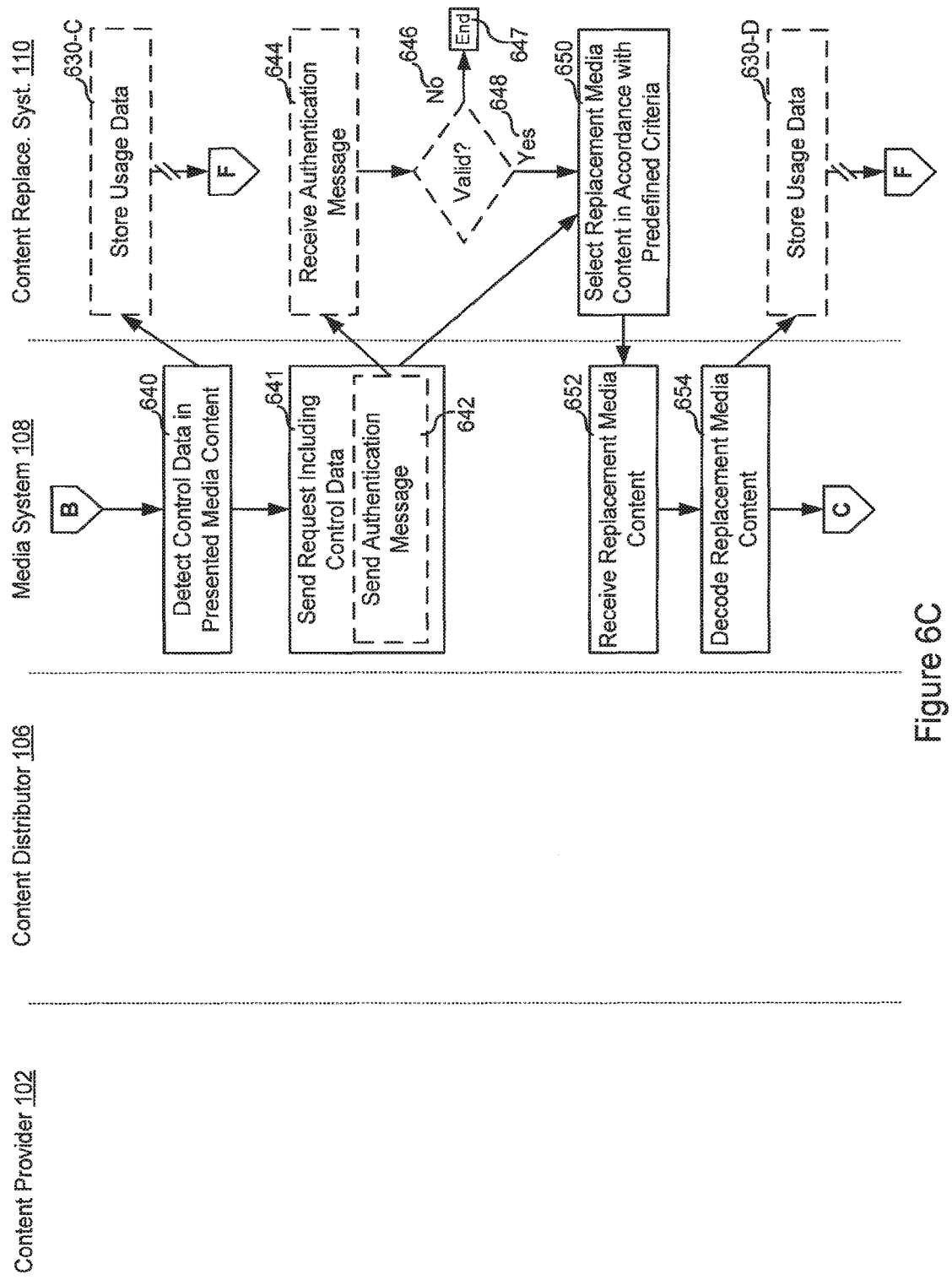
Figure 6D:
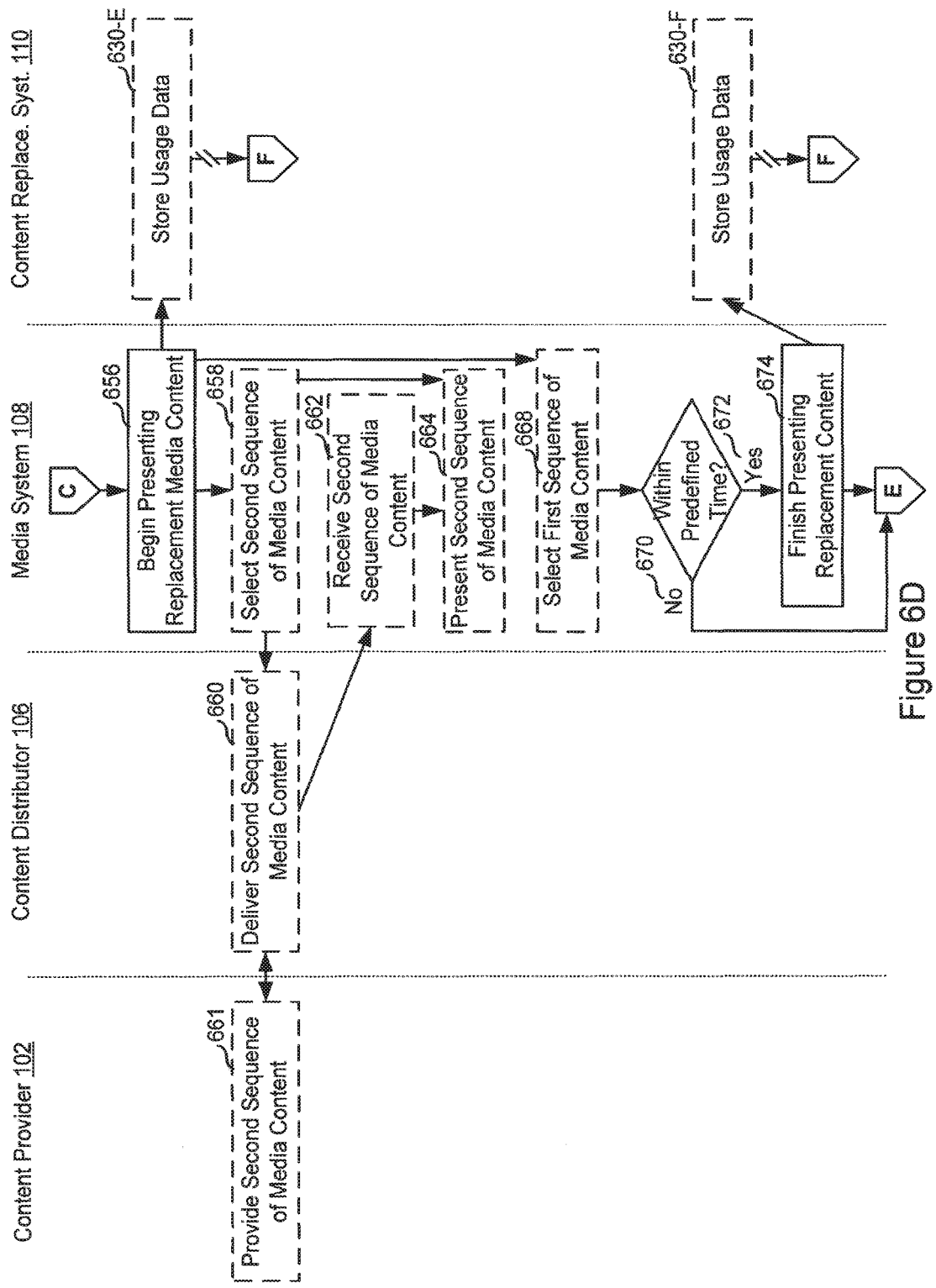
Figure 6E:
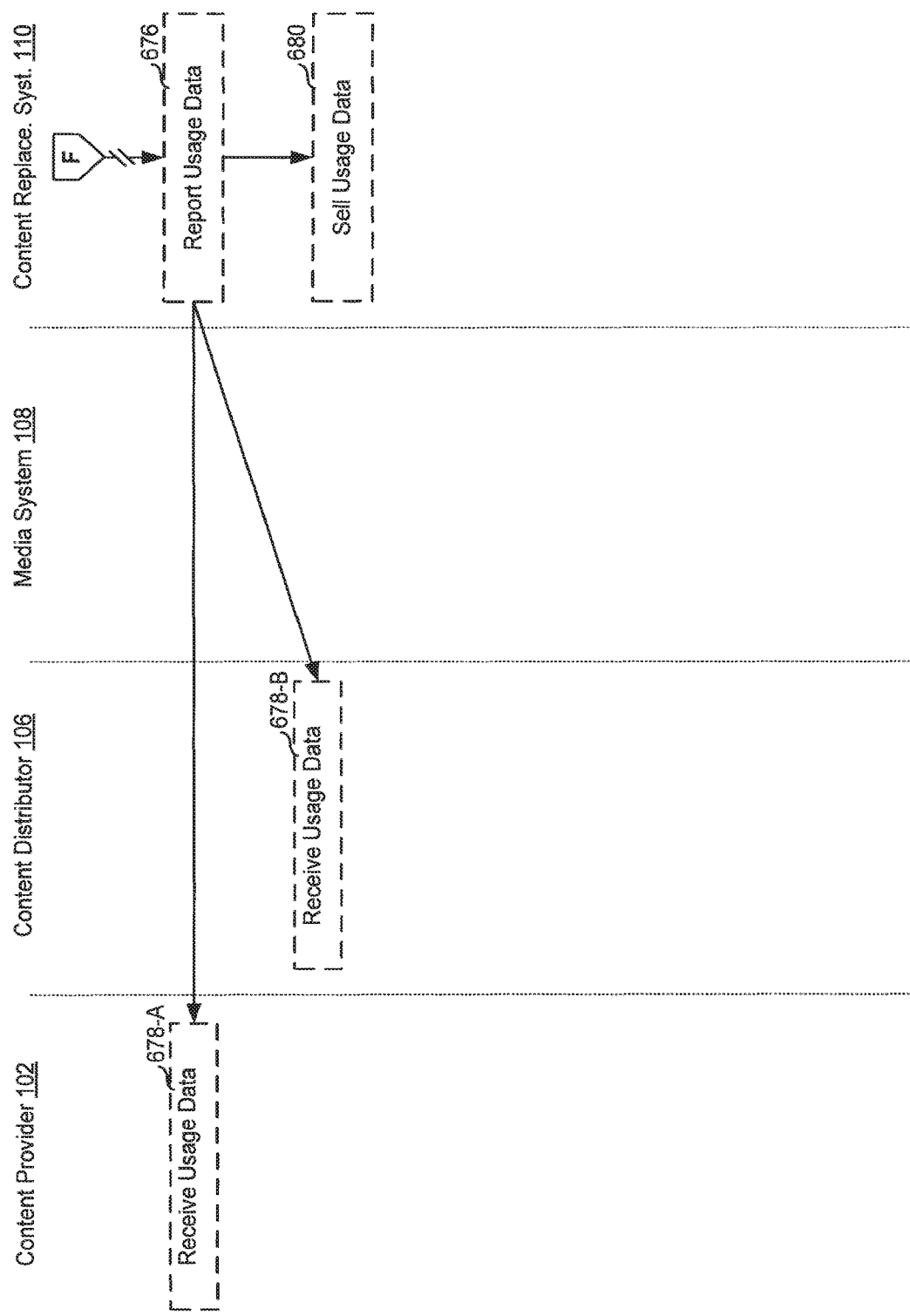

FIG. 3 is a block diagram illustrating a Media System 108 (also referred to as a "client device" or "client computing device," or "consumer electronic device") in accordance with one embodiment. The Media System 108 typically includes one or more processing units (CPUs) 304, one or more power sources 308, one or more network or other communications interfaces 310 (e.g., a coaxial cable port, an Ethernet port, and/or a wireless port), memory 306 and one or more communication buses 316 for interconnecting these components. The Media System 108 optionally may include user interface devices including a display device 312-A (for providing visual output), a speaker device 312-B (for providing audio output), a wireless or wired keyboard 314, and a remote 315 for detecting user inputs various components of the Media System 108 including the display (e.g., television) and other optional hardware components 316 such as content players 317 (e.g., DVD, VHS, Blu-Ray, Digital Video Recorder) and signal receivers 318 (e.g., cable box, satellite dish, etc.). Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 304. Memory 306, or alternately the non-volatile memory device(s) within the memory 306, comprises a computer readable storage medium. In some embodiments, memory 306 or the computer readable storage medium of the memory 306 stores one or more of the following programs, modules and data structures, or a subset thereof:

- An operating system 320 that includes procedures for handling various basic system services and for performing hardware dependent tasks.
- One or more network communication module(s) 322 that are used for connecting the Media System 108 to other computers via the communication network interface(s) 310 (wired or wireless) to one or more communication networks, such as the Internet, other wide area networks, local area networks, metropolitan area networks, satellite links, cable networks, and so on. In particular, the network communication module(s) 322 connect the Media System 108 to the Content Distributor 106 through communication network B (104-B in FIG. 1), and the Content Replacement System 110 through communication network C (104-C in FIG. 1). It should be understood that each of the plurality of network communication modules 322 may have a separate communication interface (e.g., an Ethernet port, a cell phone antenna, and a cable port), or two or more of the network communication modules 322 may share a communication interface.
- One or more demultiplexer module(s) 324 for demultiplexing a sequence of media content from a plurality of multiplexed sequences of media content (e.g., selecting a single television channel from a plurality of multiplexed television channels).
- One or more content decoder modules 326 for decoding content, including video decoders 328 (e.g., MPEG2, H.264, HDMI, DVI, composite and analog) and audio decoders 330. In some embodiments, the decoders act primarily as interfaces to process component signals or serial digital uncompressed content. It should be understood that in some embodiments, one or more of the content decoders is implemented as a separate memory device with a firmware decoder. In some embodiments, the Media System 108 continues to monitor the decoded content (e.g., from the Content Provider 102 or the Content Distributor 106), for changes that represent a change of some aspect of the decoded content (e.g., channel, volume, signal source, or other state) as it comes from one of the optional hardware components 316 that are feeding the signal to the Media System 108 that is otherwise not in communication with the CPU 304 that controls the control data detector module 332.
- A fingerprint generator module 331 (optional) for generating fingerprints of the media content for use in coordination with the Content Replacement System 110 to identify media content to replace.
- A fingerprint matching module 333 (optional) for comparing fingerprints received from the Content Replacement System 110 to content fingerprints generated by the fingerprint generator module 331.
- A control data detector module 332 (optional) for detecting control data inserted into the sequence of media content by the Content Provider 102 and/or the Content Distributor 106.
- A content selector module 334 for automatically switching between sequences of media content from a plurality of distinct sources (e.g., an original sequence of media content from the Content Distributor 106 and replacement media content from the Content Replacement System 110). In some embodiments this switching is performed in accordance with timing information included in the control data (e.g., by counting presentation frames such as NTSC video presented at 30 frames/60 fields per second). In some embodiments the timing information is based on information about the uncompressed media content (e.g., relative video frame distance from the first bits of a field in one of the data headers of the sequence of media content) rather than on information about the compressed media content (e.g., the rate of the compressed bits delivered to the Media System 108).
- A display formatting module 335 (optional) which converts the sequence of media content into a standardized content presentation format (e.g., for video media content: NTSC, ATSC, SECAM, PAL, RGN, etc.).
- A channel selector module (optional) 336 for selecting a sequence of media content from a plurality of sequences of content provided by the Content Distributor 106 to present (e.g., the selection of a television channel by the end-user). In some embodiments, this module is located at the media device, while in other embodiments (as shown in FIG. 5) this module is located remotely from the media device and is accessed by the media device through one of the network communication module(s).
- A unique identifier 337, (e.g., a MAC address), that is used to uniquely identify the Media System 108 to the Content Replacement System 110.
- An authentication module 338 for establishing a secure connection with the Content Replacement System 110, including a private key or some other authentication code.

Local storage 339 including recorded media content 340 (e.g., Digital Video Recorder data and/or temporarily cached replacement media content), user preference information 342 (e.g., the preferences of the end-user), and fingerprint data 344 (optional) including at least a subset of the fingerprints generated by the fingerprint generator module 331 and any fingerprints received from the Content Replacement System 110.

Each of the above identified programs, modules and/or data structures may be stored in one or more of the previously mentioned memory devices, and corresponds to a set of instructions for performing the functions described above. The above identified modules or programs (i.e., sets of instructions) need not be implemented as separate software programs, procedures or modules, and thus various subsets of these modules may be combined or otherwise re-arranged in various embodiments. In some embodiments, the memory 306 may store a subset of the modules and data structures identified above. Furthermore, the memory 306 may store additional modules and data structures not described above. Similarly, while the above identified memory devices are shown in a single computing device, it should be understood that each of the modules could be implemented on a separate hardware device (e.g., the control data detector module 332 and/or the fingerprint generator module 331 could be physically located in the cable set-top box, an Internet Protocol television set top box, or a consumer electronics device, such as a television or a DVD player, Blue Ray player, Personal Video Recorder, or a personal computer used to acquire and decode television content while the content is presented on a separate television) without altering the functional relationship of the control data detector module 332 and/or the fingerprint generator module 331 to other components in the Media System 108).

Figure 4:
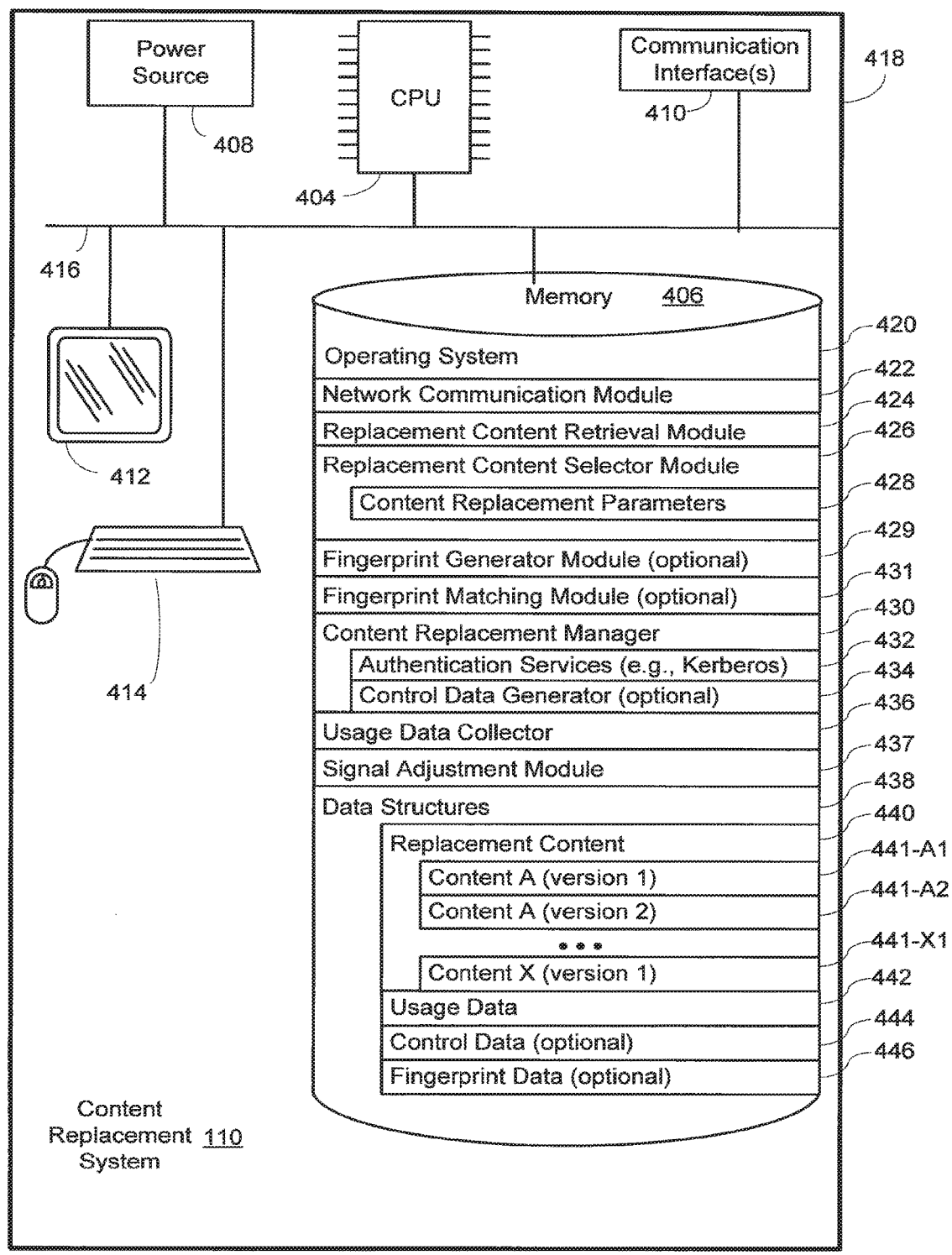
FIG. 4 is a block diagram of a content replacement system for providing replacement media content in accordance with some embodiments.

FIG. 4 is a block diagram illustrating a Content Replacement System 110 in accordance with one embodiment. The Content Replacement System 110 typically includes one or more processing units (e.g., CPUs) 404, one or more power sources 408, one or more network or other communications interfaces 410 (e.g., a coaxial cable port, an Ethernet port, and/or a wireless port), memory 406, one or more communication buses 416 for interconnecting these components, and a housing 418. The Content Replacement System 110 optionally may include a user interface comprising a display device 412 and a keyboard 414. The memory 406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 404. The memory 406, or alternately the non-volatile memory device(s) within memory 406, comprises a computer readable storage medium. In some embodiments, memory 406 or the computer readable storage medium of memory 406 stores the following programs, modules and data structures, or any subset thereof:

- An operating system 420 that includes procedures for handling various basic system services and for performing hardware dependent tasks.
- One or more network communication module(s) 422 that are used for connecting the Content Replacement System 110 to other computers via the communication network interface(s) 410 (wired or wireless) to one or more communication networks, such as the Internet, other wide area networks, local area networks, metropolitan area networks, satellite links, cable networks, and so on. In particular, the network communication module(s) 422 connect the Content Replacement System 110 to the Content Provider 102, Content Distributor 106, and the Media System 108 through communication network C (104-C in FIG. 1).
- A replacement content retrieval module 424 for retrieving replacement content (e.g., targeted advertisements) from the Replacement Content Providers 112 (e.g., targeted advertisers).
- A replacement content selector 426 module for determining what replacement media content (e.g., what targeted advertisement) to send to the Media System 108 to replace the original sequence of media content. In some embodiments the replacement content selector uses content replacement parameters 428 received from the Replacement Content Provider 112 (e.g., the company responsible for an advertising campaign or the company whose products are being advertised).
- A fingerprint generator module 429 (optional) for generating fingerprints from media content, to be used for identifying media content to replace, in coordination with the Media System 108.
- A fingerprint matching module 431 (optional) for matching fingerprints received from the Content Provider 102, Content Distributor 106 and/or generated by the fingerprint generator module 429 with fingerprints received from the Media System 108 in order to identify media content to replace.
- A content replacement manager 430 for managing the content replacement process, including mediating interactions between the various hardware and software modules described herein (e.g., for communicating instructions to the Content Provider 102 and/or the Content Distributor 106 as to where to insert the control data). In some embodiments the content replacement manager 430 includes authentication services 432 (e.g., Kerberos) for authenticating requests for replacement media content, and a control data generator 434 (optional) for generating the control data based on the content replacement parameters, as described in greater detail below.
- A usage data collector 436 for collecting usage data from the media device and storing the usage data in data structures.
- A signal adjustment module (e.g., a rateshaper, transcoder, or decoder/encoder pair) for changing the replacement content bandwidth or other characteristics to match the transmission parameters (e.g., the maximum bandwidth) associated with the path in the communication network C 104-C linking the Media System 108 with the Content Replacement System 110.
- Data structures 438 for storing data produced by and received by the other modules and instructions described herein, including:
- Replacement content 440 (e.g., 441-A1, 441-A2, 441-X1, etc.) received from the Replacement Content Provider 112. In accordance with some embodiments, multiple versions of the same replacement content (e.g., 441-A1, 441-A2) are stored in the data structures 438, where each version is configured (e.g., compressed at a different bit rate) for transmission across a communication network (e.g., 104-C) with different network characteristics (e.g., lower or higher bandwidth). As one example, Content A (version 1) 441-A1 is compressed at a low bit rate for transmission across network connections with a low bandwidth (e.g., dial-up internet), while Content A (version 2) is compressed at a high bit rate for transmission across network connections with a high bandwidth (e.g., broadband internet).

Usage data 442 collected by the usage data collector.

Control data 444 (optional) created by the content replacement manager 430. In accordance with some embodiments, the control data 444 includes timing information for use by the Media System 108 and/or the Content Replacement System to determine the timing of communications (e.g., stream switching or other actions). In some embodiments this switching is performed in accordance with timing information included in the control data (e.g., by counting presentation frames such as NTSC video presented at 30 frames/60 fields per second).

Fingerprint data 446 (optional) including fingerprints received from the Content Provider 102, Content Distributor 106, Media System 108, and/or generated by the fingerprint generator module 429.

Each of the above identified programs, modules and/or data structures may be stored in one or more of the previously mentioned memory devices, and corresponds to a set of instructions for performing the functions described above. The above identified modules or programs (i.e., sets of instructions) need not be implemented as separate software programs, procedures or modules, and thus various subsets of these modules may be combined or otherwise re-arranged in various embodiments. In some embodiments, the memory 406 may store a subset of the modules and data structures identified above. Furthermore, the memory 406 may store additional modules and data structures not described above. Similarly, while the above identified memory devices are shown in a single computing device, it should be understood that each of the modules could be implemented on a separate hardware device (e.g., the content replacement manager could be implemented as a content replacement manager server and the usage data collector could be implemented as a separate usage data collection server).

Content Replacement Using Control Data

Attention is now directed towards FIG. 5, which illustrates the flow of data through a distributed system for distributing media content to a media device in accordance with some embodiments (e.g., embodiments where media content is replaced using control data insertion and detection). Some functional components, such as the network communication interfaces, have been omitted for clarity. Media content for presentation on a Media System 108 (e.g., television shows for display on a television) begins as source media content 236-A at the Content Provider 102. The source media content is retrieved from the media content database 236-A by one or more content streaming modules 226-A, which are controlled by the master control module 224-A to create a sequence of media content by combining several sequences of media content into a single sequence of media content inserting interstitial sequences of media content into a single sequence of media content. In some embodiments the sequence of media content is created using a content switching module 228-A.

In accordance with some embodiments the media content from the content streaming module and the content switching module is uncompressed (e.g., unencoded) media content. A control data insertion module 230-A retrieves control data 234-A. In accordance with instructions from the master control module 224-A, the control data insertion module 230-A inserts control data into the sequence of media content. In some embodiments the sequence of media content with the inserted control data is encoded in an encoding module 231 into a format suitable for delivery to the Content Distributor 106 (e.g., using an audio and/or video encoding module to produce a profile of MPEG 2 or H.264 that is compatible with the transmission requirements of a given Content Distributor 106).

Take, for example, a television network creating a sequence of media content for a television channel. The sequence of media content includes 45 minutes of a television show and thirty half minute advertisements. The advertisements and the television show are stored in the media content database 236-A and are streamed through the content streaming module. The master control module 224-A instructs the content streaming module 226 which media content to stream and (optionally) uses the content switching module 228 to switch between advertisements and the television show. The control data insertion module 230-A inserts control data into the television channel content indicating that one of the half minute advertisements can be replaced by the Content Distributor 106 and that one of the half minute advertisements can be replaced by the Content Replacement System 110 with a targeted advertisement.

The Content Distributor 106 receives the sequence of media content with the inserted control data, and integrates the sequence of media content into a distribution medium such as a cable network, satellite network, IPTV network, web network, local radio frequency broadcast, mobile network, etc. In some embodiments, the Content Distributor 106 decodes an encoded sequence of media content from the Content Provider 102. When the Content Distributor 106 is configured to insert additional content (e.g., local advertisements), the Content Distributor 106 has a content streaming module 226-B for inserting media content (e.g., replacement geographically specific advertisements) into the sequence of media content, as directed by a master control module 224-B. In some embodiments, the Content Distributor 106 has a control data insertion module 230-B for inserting control data 234-B into the sequence of media content. In some embodiments, the Content Distributor 106 encodes the sequence of media content using an encoder 231 into a format suitable for distribution to the Media System 108. When there are a plurality of sequences of media content, the Content Distributor 106 multiplexes a plurality of sequences of media content using multiplexer module 232 before passing the sequences of media content off to the Media System 108.

In accordance with some embodiments, the sequence(s) of media content are passed off to the Media System 108 through a communication network associated with the Content Distributor 106 (e.g., a cable network or a satellite network). In some embodiments the sequence of media content is passed to the Media System 108 along with a plurality of other sequences of media content, and the plurality of sequences of media content pass through a channel selector module 336, which selects a single sequence of media content to deliver to the Media System 108 in accordance with instructions received from the Media System 108. In some embodiments the channel selector module 336 is at the Media System 108 (as shown in FIG. 3) and the plurality of sequences of media content are passed to the channel selector module in the Media System 108.

At the Media System 108 the, sequence(s) of media content are passed to a multi-format demultiplexer 324/decoder 326, which demultiplexes (if necessary) and decodes the selected sequence of media content (e.g., decodes an encoded video stream from one or more of MPEG2, H.264, VC1, Quicktime, or other video format). The demultiplexed and decoded sequence of media content is passed to a control data detector which analyzes the content to detect any control data. If no control data is detected, the sequence of media content is passed to the content selector 334, which passes the sequence to output devices 312 (e.g., a display and/or speaker system), where the sequence of media content is presented to the end-user.

When control data is detected, the control data detector 332 sends a request to the replacement content manager 430 in the Content Replacement System 110, which authenticates the request and reads the control data. In some embodiments the request includes a globally unique identifier of the control data detector (e.g., a globally unique identifier of the Media System 108). In some embodiments, the replacement media content has header information uniquely identifying original sequence of media content where the replacement media content is to be inserted. The multi-format demultiplexer 324/decoder 326 validates the replacement opportunity from state information maintained by the multi-format demultiplexer 324/decoder 326, by comparing the state information against the information contained in the header of the replacement media content received from the Content Replacement System 110.

The replacement content manager 430 passes information associated with the control data (e.g., an advertiser identifier, an advertisement campaign identifier, advertisement duration, advertisement pre-roll period or advertisement start time, current date and time) to the replacement content selector 426, which selects appropriate replacement content from the replacement content database 440 based on the information provided by the control data detector 332 about the parameters of the sequence of media content (e.g., the length of the ad to be replaced, the advertising campaign, etc.) and (optionally) data about the Media System 108 that is sent from the control data detector 332 or stored on the Content Replacement System 110. The Content Replacement System 110 sends replacement media content to the decoder 326 in the Media System 108.

In some embodiments the replacement media content arrives at the demultiplexer 324/decoder 326 in MPEG2 transport streams, in MP4 containers, or some other type of transport. Additionally, said replacement media content may arrive at the demultiplexer 324/decoder 326 in MPEG2, H.264, VC1, Quicktime, or other video format. In some embodiments, the replacement media content is streamed over a network connection (e.g., the internet) and the multi-format demultiplexer 324/decoder 326 has attached storage to buffer the some portion of the beginning of the replacement sequence of media and any related information, mitigating the effects of jitter introduced through streaming over the internet.

The decoder 326 decodes the replacement media content and passes the decoded replacement media content to the content selector 334, which switches over from the original sequence of media content to the replacement media content at a time that is, in accordance with some embodiments, determined by the control data (e.g., the switch synchronizes the timing of the cutover from the chosen television channel to the targeted advertisement being delivered over the Internet from the Content Replacement System 110). The output device 312 then presents the replacement media content. In some embodiments, while the sequence of media content is being presented on the output devices 312, the demultiplexer 324/decoder 326 continues to demultiplex and decode the original sequence of media content.

After the replacement media content has ended the content selector 334 automatically switches back to the original sequence of media content. In some embodiments the original sequence of media content continues to advance while the replacement media content is presented (e.g., it restarts at a later point in the sequence, such as by replacing one advertisement in the sequence with a targeted advertisement of the same length). In some embodiments the original sequence of media content does not continue to advance (e.g., it restarts at the point that it was when the replacement media content began to play, such as by inserting an advertisement into the middle of a movie without replacing any of the content of the movie, essentially pausing the movie while the advertisement is displayed).

At various points in this process the Media System 108 provides usage data to a usage data collector 436 in the Content Replacement System 110. For example, the content selector 334 informs the usage data collector 436 of the state changes at the content selector 334. Said state changes including information about the delivery of replacement media content (e.g., a targeted ads) to an output device 312 (e.g., a television). The usage data is stored in a usage data database 442 for later use by the Content Replacement System 110. For targeted advertisement, when the content selector 334 is located in the output device (e.g., a video switch in a television) usage data is more valuable than general "rating" data (e.g., the NIELSEN TV RATINGS of the Nielsen Company) because it includes information about whether the television was turned on, and thus substantially increases the accuracy of determining whether the targeted advertisement was watched.

FIGS. 6A-6E include a flowchart representing a method for remotely controlling a Media System 108 (e.g., a consumer electronic device), according to certain embodiments. This method may be governed by instructions that are stored in a computer readable storage medium and that are executed by one or more processors of one or more computer systems. Each of the operations shown in FIGS. 6A-6E may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

In accordance with one embodiment, the Content Provider 102 and the Content Replacement System 110 perform a series of operations (602-A) and (602-B), including in some embodiments, receiving instructions from a Replacement Content Provider 112 (e.g., receiving instructions from an advertiser indicating the circumstances under which advertisements in a television broadcast stream are to be replaced with targeted advertisements provided by the advertiser). As one example, a car manufacturer, purchases a half minute advertising placement opportunity with a Content Provider 102 (e.g., a television network) and pays a content replacement service to insert a targeted advertisement in the advertisement placement opportunity. The Content Replacement System 110 obtains (603) replacement media content (e.g., a targeted advertisement) from the Replacement Content Provider (112 in FIG. 1) and obtains (604) content replacement parameters from the Replacement Content Provider 112 that indicate when the replacement content should be inserted into a sequence of media content. In some embodiments those parameters include the advertiser identifier, the advertising campaign identifier, a unique identifier of the device playing the advertisement and/or the starting time of the advertisement.

The Content Provider 102 obtains (606) source media content. In some embodiments, the Content Provider 102 obtains the source media content from a satellite link to a content source (e.g., a television studio). Typically, this data is processed at the Content Provider 102 into a form that lends itself to storage. Additionally, media content can be received from a content source by accessing the content source through a proprietary network or a public network such as the Internet. In some embodiments, a Content Distributor 106 physically delivers a storage medium containing a digital copy of a programming content to the Content Provider 102. In some embodiments, media content is acquired and processed for transmission to viewers in real time, and not first stored (e.g., a live satellite feed of a football game). In some embodiments acquiring and processing media content for transmission to viewers in real time includes buffering at least a portion of the content (e.g., transmitting the media content with an eight second delay to compensate for any variations in the rate at which the media content is being received by the Content Provider 102).

In accordance with some embodiments the Content Provider 102 determines (608) one or more transition points in the content. For example, the Content Provider 102 selects three five-minute blocks for commercial breaks in an hour-long television program. The Content Replacement System 110 creates (610) control data that, in some embodiments, includes triggering keys (611) where present (e.g., when the triggering keys are a specific type of control data). The Content Replacement System 110 sends the control data to the Content Provider 102. The Content Provider 102 receives (612) the control data, including the triggering keys (613). In some embodiments a triggering key is a sequence of data that indicates to a computing system reading the control data that substantive control data is about to be provided and should be recorded by the computer system.

The Content Provider 102 creates a sequence of media content and incorporates (614) at least a subset of the control data and the triggering keys into the sequence of media content. In some embodiments, incorporating the control data into the media content includes using steganographic techniques (e.g., digital watermarking, etc.) or other techniques to conceal the control data in the sequence of media content, as described in greater detail below.

In some embodiments the Content Distributor 106 receives the sequence of media content and identifies (616) transition points within the sequence of media content. In some embodiments, the Content Distributor 106 also receives (618) control data including (619) triggering keys. The Content Distributor 106 may incorporate (620) additional control data into the sequence of media content and (optionally) using (621) steganographic techniques, as described in greater detail below. It should be understood that, in some embodiments, only the Content Provider 102 incorporates control data into the sequence of media content, while in other embodiments, only the Content Distributor 106 incorporates control data into the sequence of media content. Additionally, in some embodiments, both the Content Distributor 106 and the Content Provider 102 incorporate control data into the sequence of media content. (For example, both a television network and a cable company have a relationship with a targeted advertiser and the television network and the cable company each insert control data into the video feed/stream to replace a different advertisement in the same television feed with a targeted advertisement).

The Content Distributor 106 prepares (622) the media content for delivery to a Media System 108. In some embodiments the Media System 108 sends a request indicating the selection (624) of a first sequence of media content (e.g., a first television channel). In this embodiment, the Content Distributor 106 delivers (626) the first sequence of media content to the Media System 108. The first sequence of media content is decoded (628) and presented (638) by the Media System 108. For example, in a switched digital video system, the end-user requests to view channel "42" of a plurality of cable channels, the request goes out over the communications network and a single channel is returned to the end-user and decoded on the end-user's home equipment (e.g., a cable box and a television). In some embodiments the decoder reports usage data to a Content Replacement System 110, this reporting may occur over an alternate communication network (e.g., a second communication network). The Content Replacement System 110 stores (630-A) the usage data, as described in greater detail below.

In some embodiments, the first sequence of media content is a sequence of video content including video content requested by the end-user and advertisement video content. In some embodiments, the replacement media content is a sequence of video content including one or more replacement advertisements.

In some embodiments, the end-user does not send a network request for a first sequence of media content, but rather the Content Distributor 106 delivers (632) a plurality of sequences of media content (e.g., multiplexed television channels). The Media System 108 receives the plurality of sequences of media content (e.g., multiple television channels) and the end-user selects (634) a first sequence of the media content. In some embodiments, the Media System 108 demultiplexes the plurality of sequences of media content and decodes (636) the selected first sequence of media content. In some embodiments usage data is sent by the Media System 108 to the Content Replacement System 110 and stored (630-B) for later use.

In some embodiments, the Media System 108 receives the first sequence of media content from a media Content Distributor 106 over a first communication network (e.g., a managed content distribution network such as a cable network or a satellite network), the first sequence of media content includes associated control data for facilitating the replacement of media content in the first sequence of media content with replacement media content. The Media System 108 presents (638) the first sequence of media content to an end-user of the Media System 108. While presenting the content to the end-user, the Media System 108 detects (640) the associated control data embedded within the first sequence of media content. In accordance with some embodiments, the Media System 108 stores (630-C) usage data and/or sends the usage data to a Content Replacement System 110 for later use.

In response to detecting the control data, the Media System 108 sends (641) a request to the Content Replacement System 110 over a second communication network (e.g., an unmanaged network such as the Internet) that is distinct from the first communication network (e.g., a managed network) including at least a portion of the control data. In some embodiments the request includes an authentication message (642). A number of different authentication techniques may be used (e.g., Kerberos, RSA, etc.), some of which involve multiple communications between the Media System 108 and the Content Replacement System 110. If the authentication is not (646) valid, then the process ends (647), and no replacement media content is sent to the Media System 108. If the authentication message is valid (648) and the Content Replacement System 110 is able to authenticate the request, then the content replacement selects (650) replacement media content in accordance with predefined criteria. One having ordinary skill in the art would readily understand that any authentication process or procedure known in the art could be used to authenticate communications between the Media System 108 and the Content Replacement System 110.

It should be noted that the media device does not request particular replacement media content. Rather, the media device merely reports a particular set of control data to the Content Replacement System 110, and the Content Replacement System 110 uses the communication from the media device (including one or more of a unique identifier of the media device, and the control data) along with, in some embodiments, additional data stored at the Content Replacement System 110 to determine the best replacement media content. In this way the Content Replacement System 110 can make a sophisticated decision as to what replacement media content is the most suitable for the particular end-user for the particular content replacement opportunity. Moreover, the Media System 108 is not required to do any processing other than extracting the control data and sending it to the Content Replacement System 110.

In some embodiments, parameters (e.g., predefined criteria) are provided by the Replacement Content Provider 112 (e.g., an advertiser). These parameters enable the Content Replacement System 110 to select replacement media content. In some embodiments the parameters indicate that the replacement of an original sequence of media content with replacement media content is authorized (e.g., by an advertiser).

As one example, the control data includes an advertisement identifier and/or an advertisement campaign identifier for the generic advertisement to be overwritten with a targeted replacement advertisement delivered by the Content Replacement System 110. In some embodiments, the parameters identify the specific targeted advertisement that may be inserted as a substitute for the generic advertisement. The advertisement identifier and the advertisement campaign identifier are used by the Content Replacement System 110 to select an advertisement that is authorized by the advertiser to overwrite the broadcast advertisement based on parameters provided by the Replacement Content Provider 112 (e.g., advertiser) and maintained in a database in the Content Replacement System 110.

Similarly, a request for replacement media content may include parameters that enable the Content Replacement System 110 to select advertisements that best match the technical limitations of the Media System 108. For example, such parameters may include: the video profile (e.g., SD, HD and resolution parameters) and the bandwidth (e.g., data rate) of the network connection. In a complementary implementation, these parameters inform the content replacement server to assist in formatting or transcoding the substitute advertisement video so it is technically compatible with the Media System 108.

In some embodiments, a request for replacement media content includes parameters that enable the Content Replacement System 110 to select advertisements that target the viewer based on program context. These parameters enable the Content Replacement System 110 to select advertisements that best match the interests of the viewer based on the characteristics of the content being viewed. Content characteristics can also be referred to as content properties or content metadata. Content metadata that would help the Content Replacement System 110 select an advertisement that targets a typical viewer of said content include the rating of the content and/or the genre of the content (e.g., Kids, Sports, Financial News, etc.) Content metadata can be obtained in many ways. One way to obtain content metadata is by extracting the metadata from guide listings data. Another way of obtaining content metadata is where the control data includes content metadata.

A request for replacement media content may also include parameters that enable the Content Replacement System 110 to select advertisements that target the viewer based on the viewer demographic, psychographic or behavioral information. These parameters enable the Content Replacement System 110 to select advertisements that best match the interests of the viewer based on the viewer's demographic information.

An example of demographic information is the Media System 108 location, such as a zip code. Media System 108 location information maybe stored on the Media System 108 directly and can then be sent directly as a parameter in the request for replacement media content. In some cases, Media System 108 location information may not be stored on the Media System 108 directly however it can be determined at the backend by mapping the media system identifier to the location in an account database or another database within which there is a mapping of the media system identifier to its owner's home address. One example of such a database is a product registration database populated at the Media System 108 purchase point or populated by way of a registration mechanism such as in the case of a warranty registration. In the case where media system location information is not stored directly on the Media System 108, a parameter in the request from the Media System 108 would include the identifier. The identifier would be used by a Content Replacement System 110 component as a key into a database at the back-end to resolve the media system location information. This location information would used to select an advertisement that targets the derived location.

In some embodiments, additional information about the end-user of the Media System 108 is provided by one or more of: a Content Provider 102 (e.g., a Content Provider 102 knowing what premium stations the end-user has purchased), a Content Distributor 106 (e.g., a cable network having data about what channels the end-user watches); a manufacturer of the Media System 108 (e.g., information filled out on a warrantee card); and a service provider to the end-user of the Media System 108 (e.g., a cell phone provider having information about what area codes the end-user calls the most and what kind of cell phone the end-user owns). In some embodiments this user data (e.g., data about the end-user) may be stored in the Content Replacement System 110 and used by the Content Replacement System 110 to select replacement media content.

The Media System 108 receives (652) the replacement content and decodes (654) the replacement media content. In accordance with some embodiments, the Content Replacement System 110 receives and stores (630-D) usage data from the decoder/multiplexer when the replacement media content is decoded. After receiving and decoding the replacement media content, the Media System 108 presents (656) the replacement media content to the end-user of the Media System 108 instead of the first sequence of media content. In some embodiments, the replacement media content has an end, and the Media System 108 detects the end of the replacement media content and ceases to present the replacement media content and presents the first sequence of media content.

As one example, an end-user is watching television channel "42," the television detects that a targeted advertisement spot is coming up in eight seconds. In response to detecting the control data, the television requests targeted advertisement content from the Content Replacement System 110 over an internet connection. After authenticating the request, the Content Replacement System 110 sends a targeted advertisement, which is selected based on known demographic information about the end-user or the television of the end-user (e.g., provided when the end-user purchased the television). The replacement media content is delivered to the end-user's television over the internet connection and is played on the television instead of the regular advertisement. When the targeted advertisement ends, the channel that the end-user was watching is redisplayed.

In accordance with some embodiments, receiving the first sequence of media content includes receiving it from a managed television network, such as a satellite network, radio frequency broadcast network, internet protocol television system or cable network, while accessing the replacement media content includes accessing an unmanaged IP network, such as the Internet, or an IP network managed by another, such as in a self-contained hotel network. In a related embodiment, the method may make use of a virtual second communication network where the second communication network differs from the first communication network on one or more of layers one through six of the Open Systems Interconnection (OSI) network layer stack. In other words, the second communication network can be a virtualized separate network.

In accordance with some embodiments, while presenting the replacement media content to the end-user, the Media System 108 receives (658) a request to select a second sequence of media content (e.g., to change from channel "42" to channel "10"). In some embodiments the Media System 108 sends a request to the Content Distributor 106 for the second sequence of media content, and the Content Distributor 106 delivers (660) sequence of media content that is, in accordance with some embodiments, being provided (661) by the Content Provider 102. The Media System 108 receives (662) the second sequence of media content, and presents (664) the second sequence of media content to the end-user. In some embodiments, the Content Distributor 106 is sending the Media System 108 a plurality of sequences of media content, and the Media System 108 merely demultiplexes and decodes the requested second sequence of media content. In either case, the Media System 108 ceases presenting the replacement media content; and, instead presents (664) the second sequence of media content to the end-user.

Thus, even though the Media System 108 has replaced the content and is no longer displaying the first sequence of media content (e.g., the first channel that the end-user was watching), the Media System 108 is still able to detect and respond to a request of the end-user to change the sequence of media content. For example, the end-user is watching channel "42," an advertisement is replaced with a targeted advertisement. Before the targeted advertisement is finished, the end-user switches to channel "10." In response, instead of continuing to display the targeted advertisement, the television switches to the new channel (e.g., channel "10").

In some embodiments, while presenting the second sequence of media content to the end-user, the media device continues to advance the replacement media content (e.g., the targeted advertisement continues to advance). In some embodiments, the end-user selects the first sequence of media content after having previously selected the second set of media content, (e.g., the end-user switches back from channel "10" to channel "42"). The media device receives a request (668) for the first sequence of media content; and in response to the request for the first sequence of media content, if the request was (672) made within a predefined time (e.g., the length of the replacement media content, so that the replacement media content is still advancing), the Media System 108 finishes presenting (674) the replacement media content. However, if the request was not (670) made within a predefined time (e.g., the length of the replacement media content, so that the replacement media content has ended), the Media System 108 resumes presenting (638) the first sequence of media content to the end-user.

Similarly, in another embodiment, while the replacement subset of media content is being sent to the viewer display, the Media System 108 continues to monitor the first sequence of media content for changes in the characteristics of the sequence, such as changes in volume, changes in channels, invocation of Emergency Alert System (EAS), invocation of an on-screen program guide, etc., and is responsive to such changes by either switching back to the first sequence of media content (e.g., television stream) from the replacement media content (e.g., targeted advertisement stream), or makes changes in characteristics of the replacement media content (e.g., targeted advertisement stream) received over the alternate distribute network to mirror changes in the monitored first sequence of media content (e.g., original television stream) to the replacement media content.

In some embodiments, the Content Replacement System 110 sends (676) the stored usage data to the Content Provider 102 and/or the Content Distributor 106. The Content Provider 102 and the Content Distributor 106 receive (678A, 678-B) the usage data and may use that data to improve their advertising strategies. In some embodiments, the Content Replacement System 110 stores the usage data and sells (680) the usage data.

Steganographic Triggers

Figure 7:
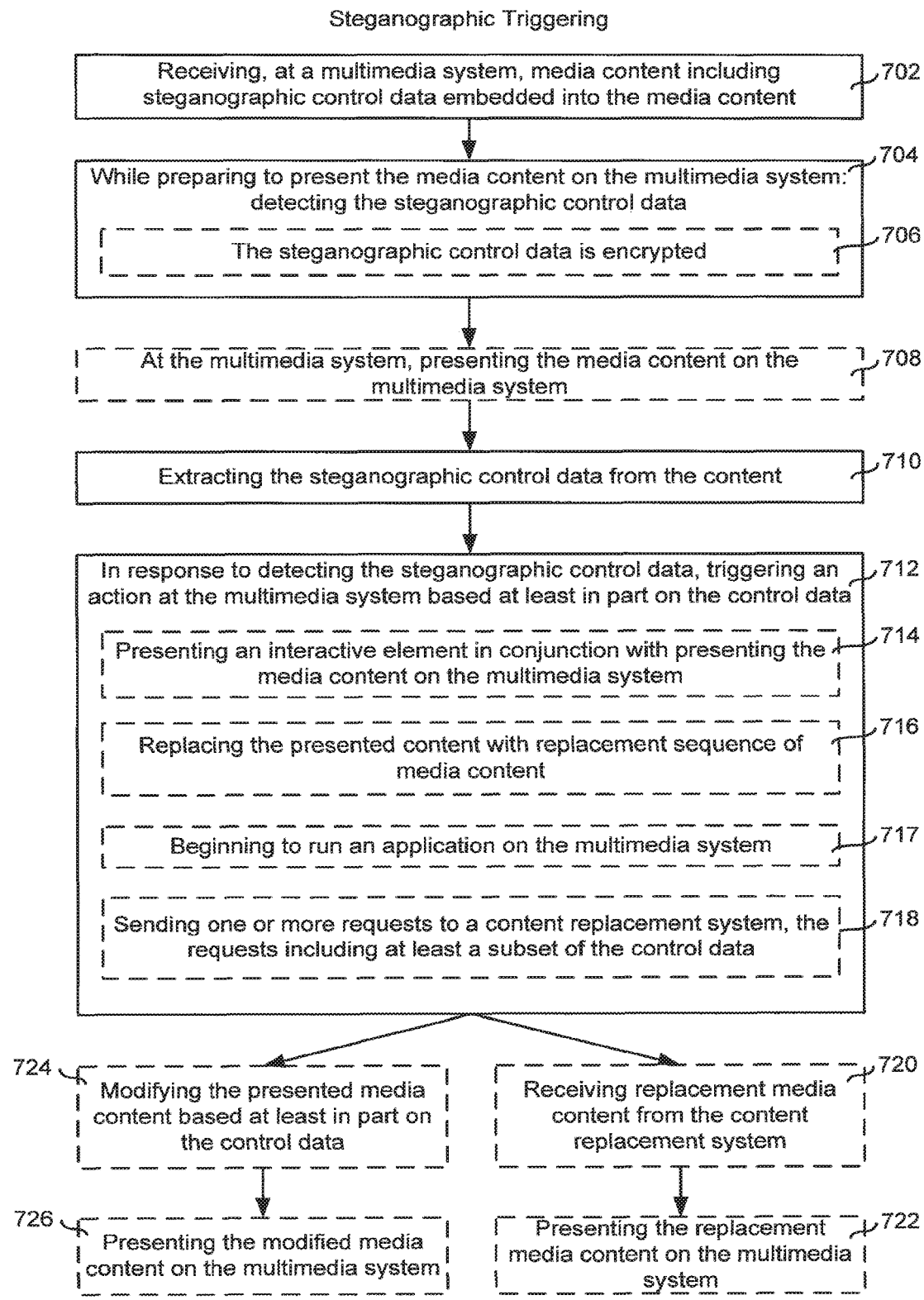
FIG. 7 is a flow diagram of a method of triggering actions using steganographic data in accordance with some embodiments.

Attention is now directed toward FIG. 7, which illustrates a method of triggering actions using steganographic data in accordance with some embodiments. FIG. 7 includes a flowchart representing a method for triggering actions using embedded steganographic data. This method may be governed by instructions that are stored in a computer readable storage medium and that are executed by one or more processors of one or more computing systems. Each of the operations shown in FIG. 7 may correspond to instructions stored in memory or a computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

Steganography includes inserting a message into a plurality of data such that the presence of the message within the data is concealed from detection. In some embodiments of digital steganography, this means including steganographic coding inside of a transport layer, such as a document file, image file, program or protocol (e.g., by adjusting the chrominance of one out of every 100,000 pixels to correspond to a letter in the alphabet, a change so subtle that someone not specifically knowing where and how to look for it is unlikely to notice it.) Steganographic data (e.g., watermarks) may be inserted into media content using any method known to those skilled in the art. As one example, U.S. Pat. No. 6,411,725, hereby incorporated by reference in its entirety, teaches the application of watermarks in video signals to mark individual objects within a video frame with additional data.

An advantage of using steganographic triggers instead of control data that is not steganographically encoded is that steganographically encoded control data is able to pass intact through most data filters, such as bandwidth shaping filters, that strip out-of-band data but leave intact the in-band video and audio programming data (e.g., including the control data that is steganographically incorporated into the audio or video signal). In accordance with some embodiments, using steganography to embed the splice insert control data and associated content replacement opportunity (e.g., "ad avail") information within the content stream itself, the potential problem of data and control data stripping by any Content Distributors 106 (cable television company, internet protocol television provider, satellite network, etc.) is reduced or eliminated.

Accordingly, a method and system is disclosed for using steganographic data to trigger events. A Media System 108 receives (702) media content including steganographic control data embedded into the media content. While preparing to present the media content on the Media System 108, the Media System 108 detects (704) the steganographic control data. In some embodiments, preparing to present media content includes demultiplexing and decoding media content containing the steganographic control data, as discussed in greater detail above. In some embodiments preparing to present media content includes decoding a stream of content.

In some embodiments the steganographic control data is encrypted (706). In this embodiment, even if the steganographic control data is detected, the content of the steganographic message will be concealed. In some embodiments the steganographic control data is decrypted at the Media System 108, while in other embodiments, at least a portion of the steganographic control data is sent to a second computing system (e.g., a Content Replacement System 110) without decrypting the control data. In some embodiments, the second computing system decrypts the encrypted control data and sends a response to the Media System 108 (e.g., instructions to perform an action or replacement media content). In this embodiment, the Media System 108 is never aware of the contents of the encrypted control data.

In some embodiments the media content is presented (708) by the Media System 108, prior to any action being taken with respect to the steganographic control data. For example, while an end-user is viewing a stream of video content, a control data detector in the Media System 108 is concurrently looking for steganographic control data in the stream of video content.

When the Media System 108 detects the steganographic control data it also extracts (710) the steganographic control data from the media content. In response to detecting the steganographic control data, the Media System 108 triggers (712) an action at the Media System 108 based at least in part on the control data. In some embodiments the action is based on the presence of the control data (e.g., upon detecting embedded control data, sending an encrypted portion of the control data to a second computing device). In some embodiments, the action is based at least in part on the content of the control data (e.g., receiving control data in a television stream indicating that a replacement advertisement should be requested and then sending a request to a Content Replacement System 110 for a replacement advertisement).

In some embodiments, triggering an action includes presenting (714) an interactive element in conjunction with presenting the media content on the Media System 108. For example a selectable object may appear on the display of the Media System 108. In some embodiments an overlay appears on the display of the Media System 108.

In some embodiments triggering an action includes replacing (716) the presented content with replacement media content. For example, in response to detecting the steganographic data, the Media System 108 changes channels or displays a prerecorded video message. In some embodiments, triggering the action includes invoking (717) an application on the Media System 108. For example, in response to detecting steganographic control data, the Media System 108 begins to record the current program onto a hard drive on a digital video recorder, thus reducing the amount of time spent by the end-user trying to set up the digital video recorder to record the television show. In an alternative embodiment, the application is an interactive program that works in a coordinated fashion with television programming being watched on a television.

In some embodiments, the triggering action at the Media System 108 includes sending (718) a request to a Content Replacement System 110, the request including at least a subset of the control data (optionally, an encrypted subset of the control data), as described in greater detail above with reference to FIGS. 6A-6F. As one example, steganographic control data is detected in television broadcast feed by a Media System 108 indicating a generic advertisement to replace with a targeted advertisement; the Media System 108 extracts the steganographic control data; the Media System 108 sends the steganographic control data to a Content Replacement System 110; the Content Replacement System 110 selects a targeted replacement advertisement and sends it to the Media System 108; and the Media System 108 replaces the generic advertisement with the targeted advertisement. In some embodiments the method further includes receiving (720) replacement media content from the Content Replacement System 110; and presenting (722) the replacement media content on the Media System 108. Such a system and method is discussed above in greater detail with reference to FIGS. 6A-6F, where the control data is steganographic control data.

In some embodiments, the Media System 108 modifies (724) the presented media content based at least in part on the control data; and presents (726) the modified media content on the Media System 108. For example, upon detecting, extracting and interpreting steganographic control data, a television may switch inputs from a managed television network to an unmanaged network such as the Internet as described in greater detail above with reference to FIGS. 6A-6F. For example, the television may switch inputs in order to, for example, view an advertisement or obtain access to view a pay-per-view channel by contacting a web site; display an "unauthorized access" message; request additional data from the television network such as a movie for later viewing, program information about the signal being viewed, or times the current program will be rebroadcast; download electronic program guide (EPG) data, news ticker data, or real-time sports statistics; transmit identifying information such as channel, date, and time to a viewer statistics reporting service; or display caller identification information for a voice-over-IP telephone service.

In some embodiment, modifying the media content may include altering the appearance of the programming presentation, for example by reducing the size of the image and optionally placing it on the screen with a variety of other images or other reduced sized programming. Additionally, in some embodiments, the audio may be altered by augmenting or replacing the audio with audio generated from the Media System 108, or other audio available from the Content Distributor 106.

Content Replacement Using Fingerprints

Figure 8:
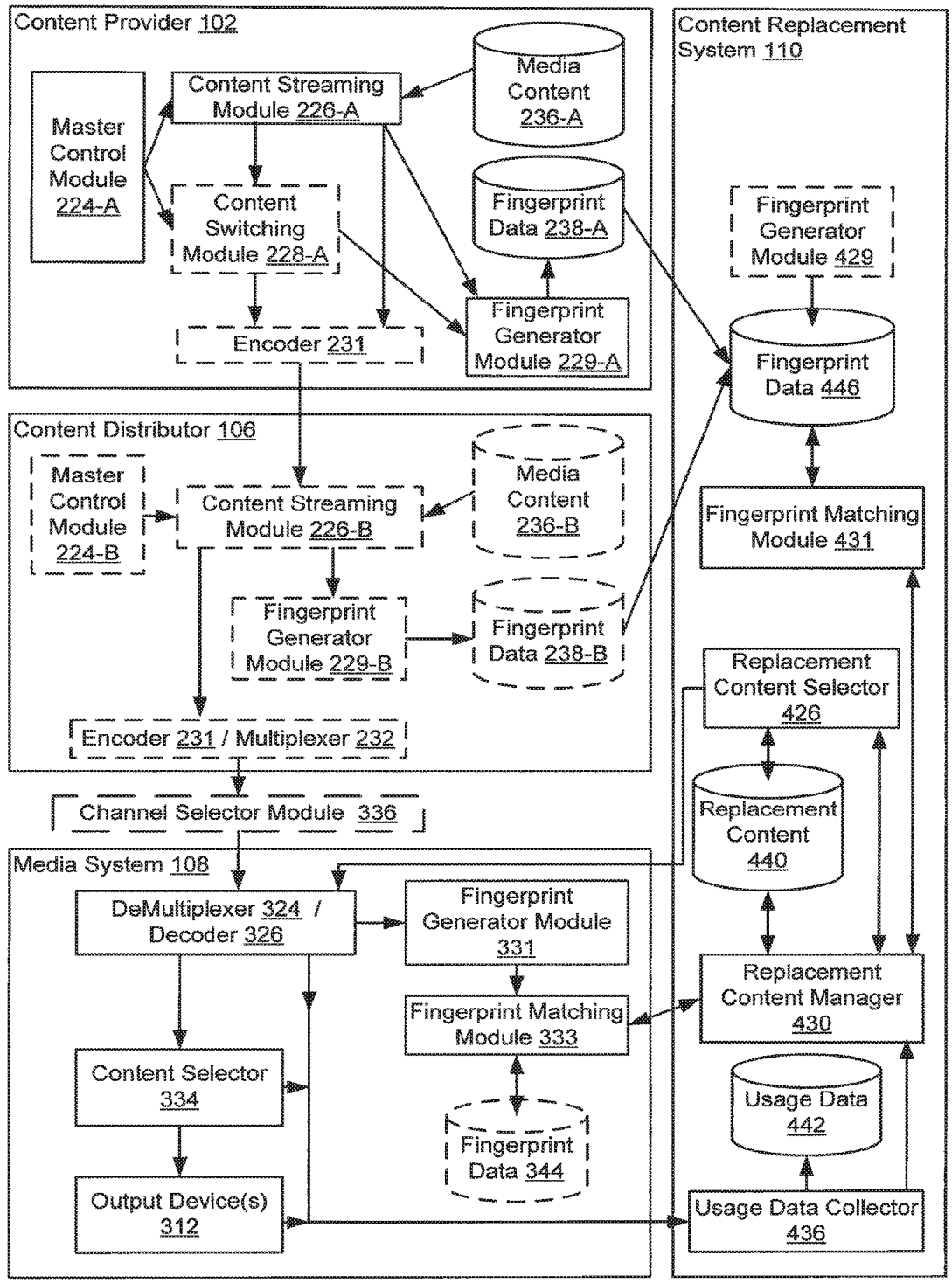
FIG. 8 is a block diagram illustrating the flow of data through a distributed system for distributing media content to a media system using fingerprint detection in accordance with some embodiments.
Figure 9A:
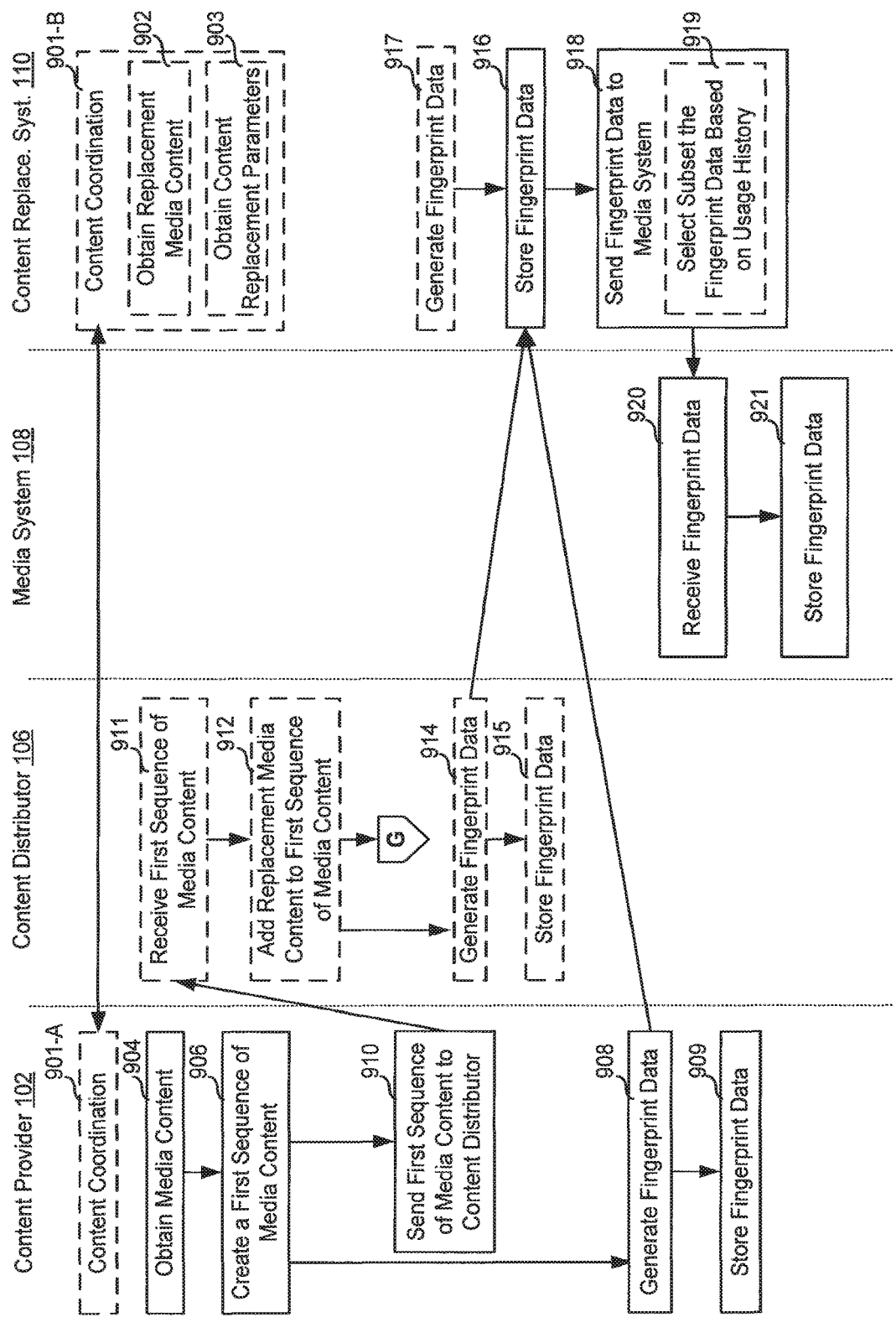
FIG. 9A-9F include a flow diagram of a process for remotely controlling media systems using detected fingerprints in accordance with some embodiments.
Figure 9B:
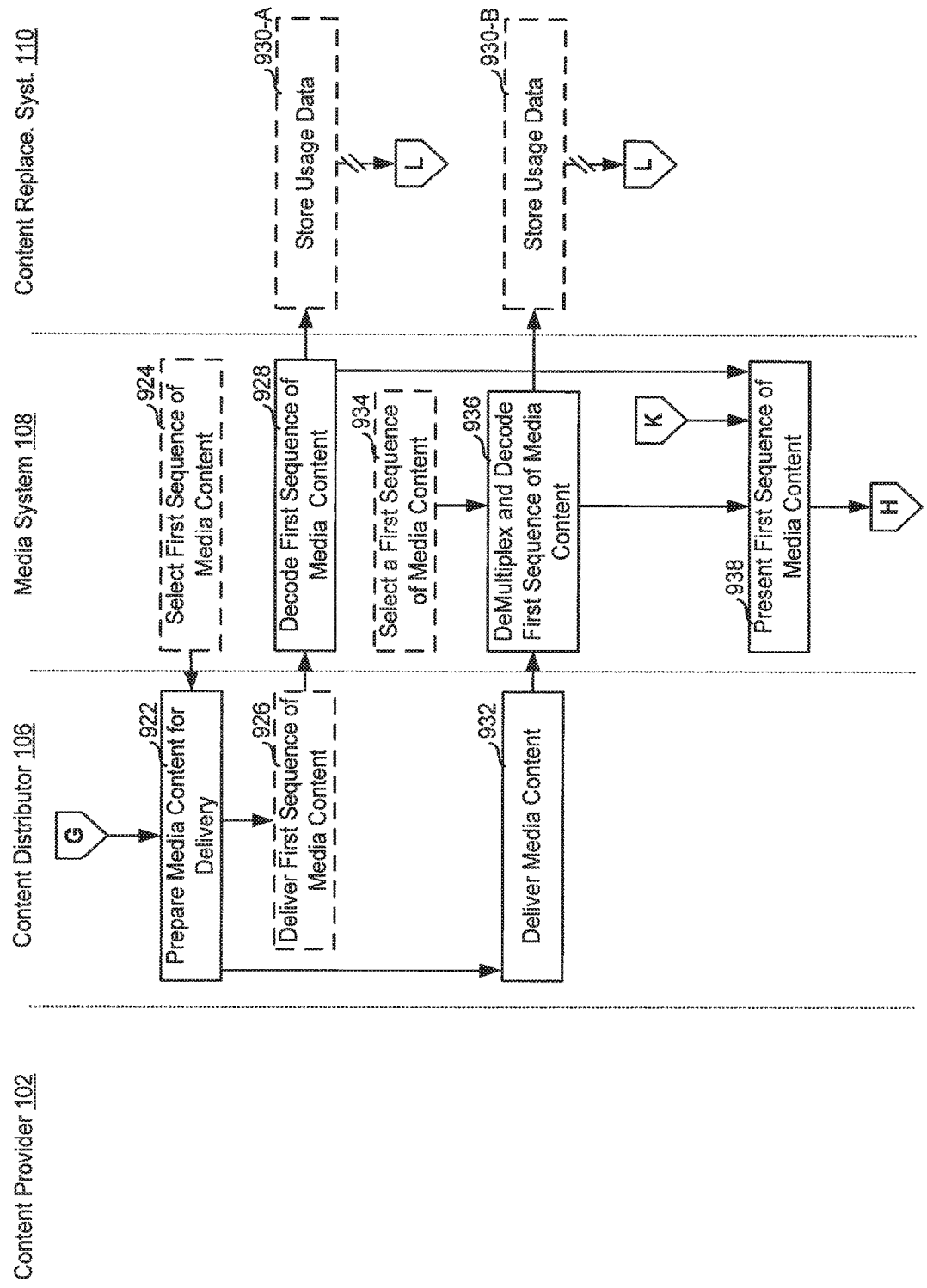
Figure 9C:
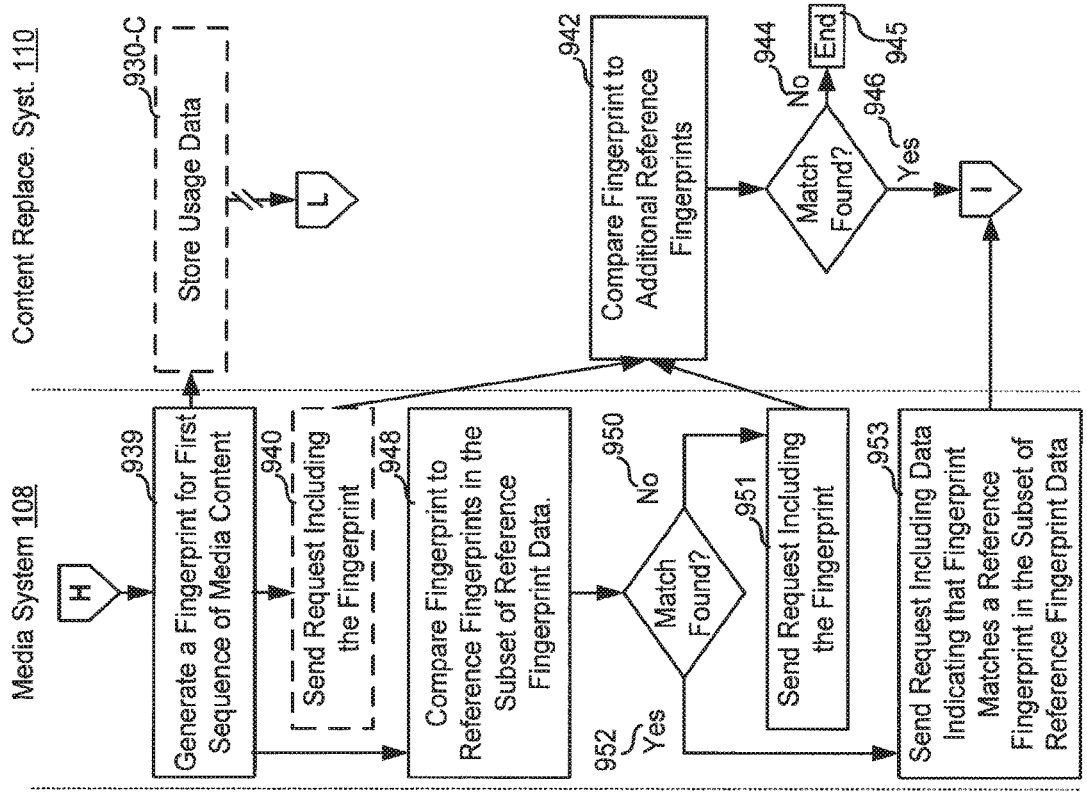
Figure 9D:
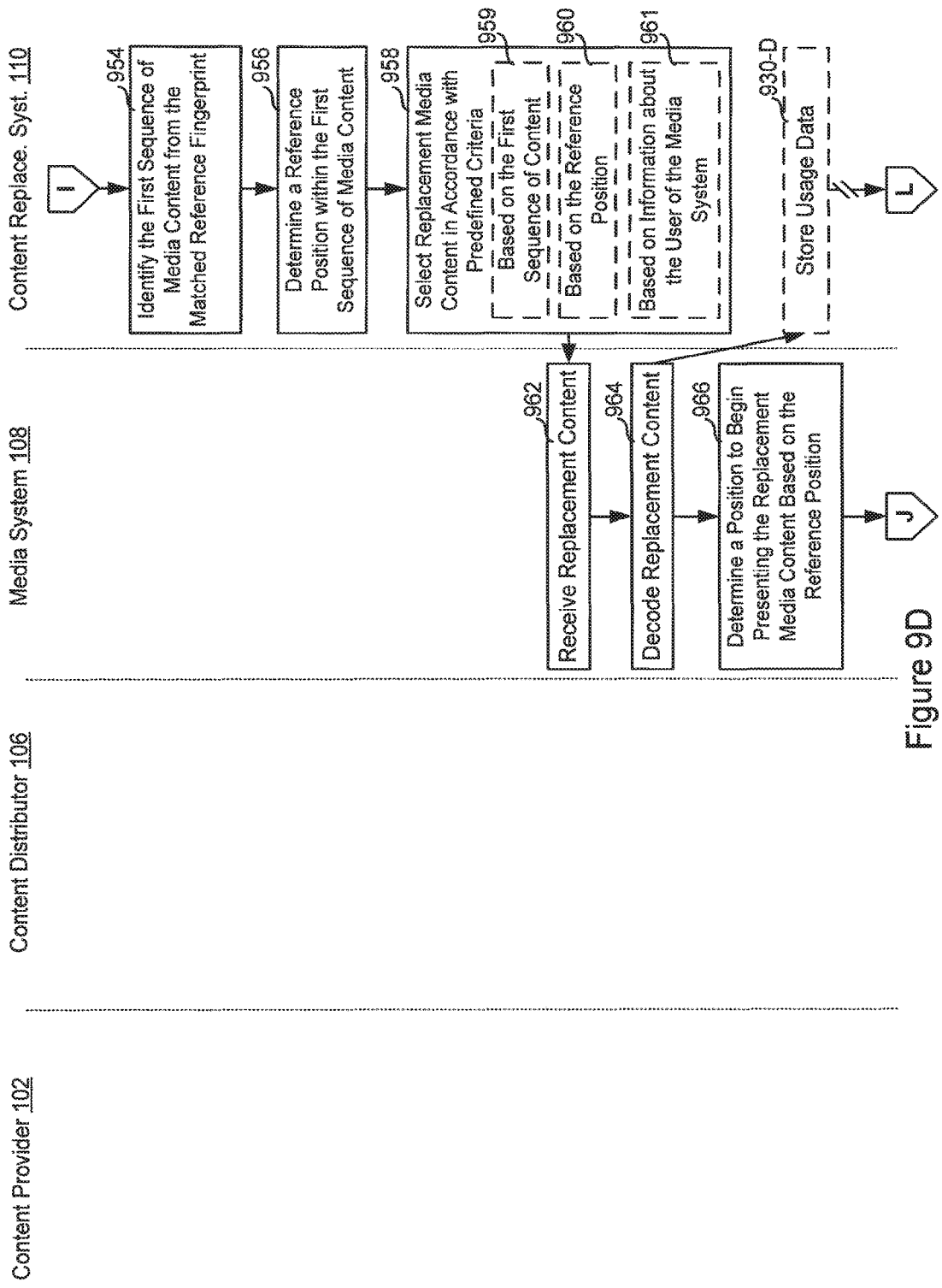
Figure 9E:
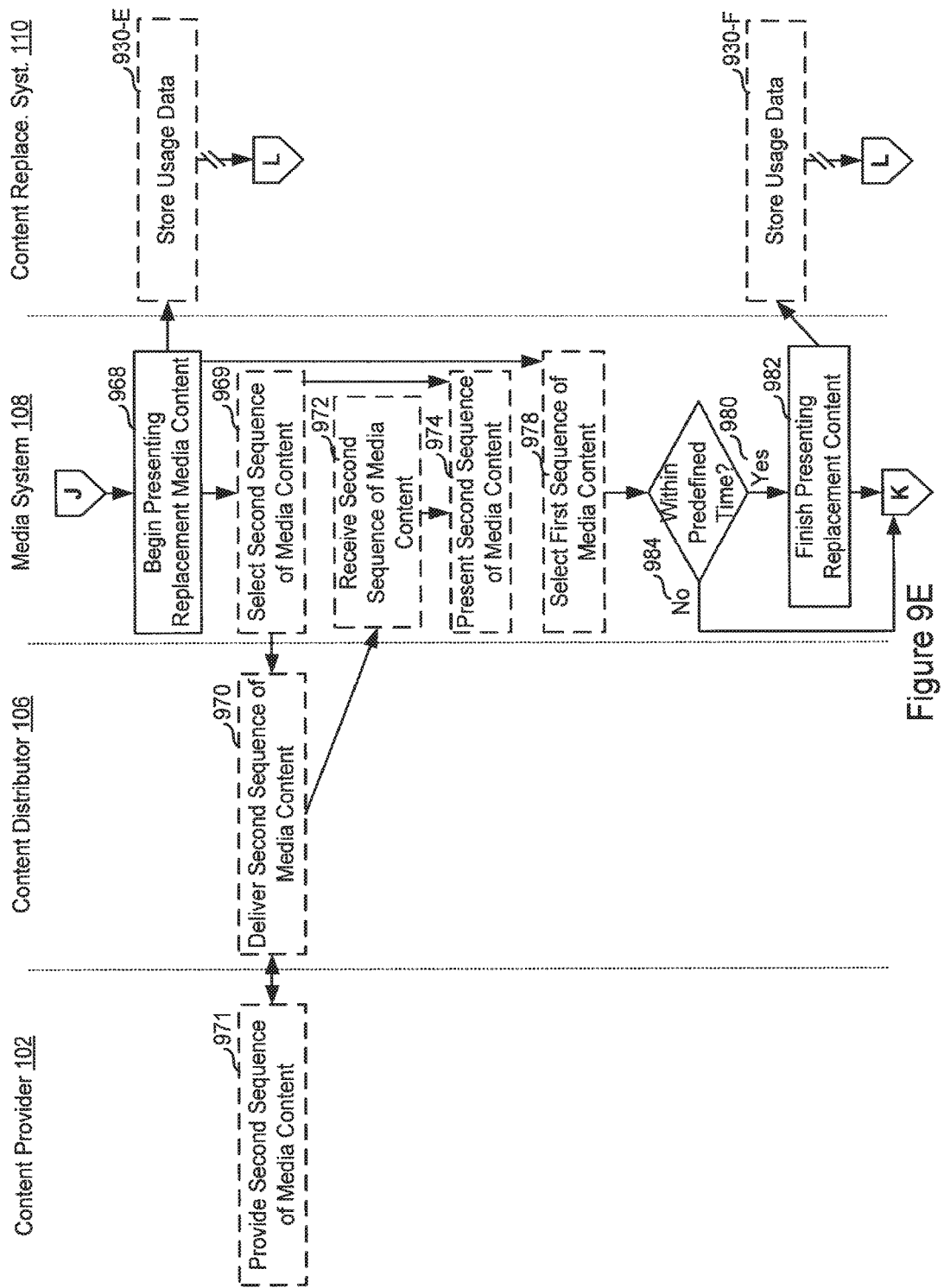
Figure 9F:
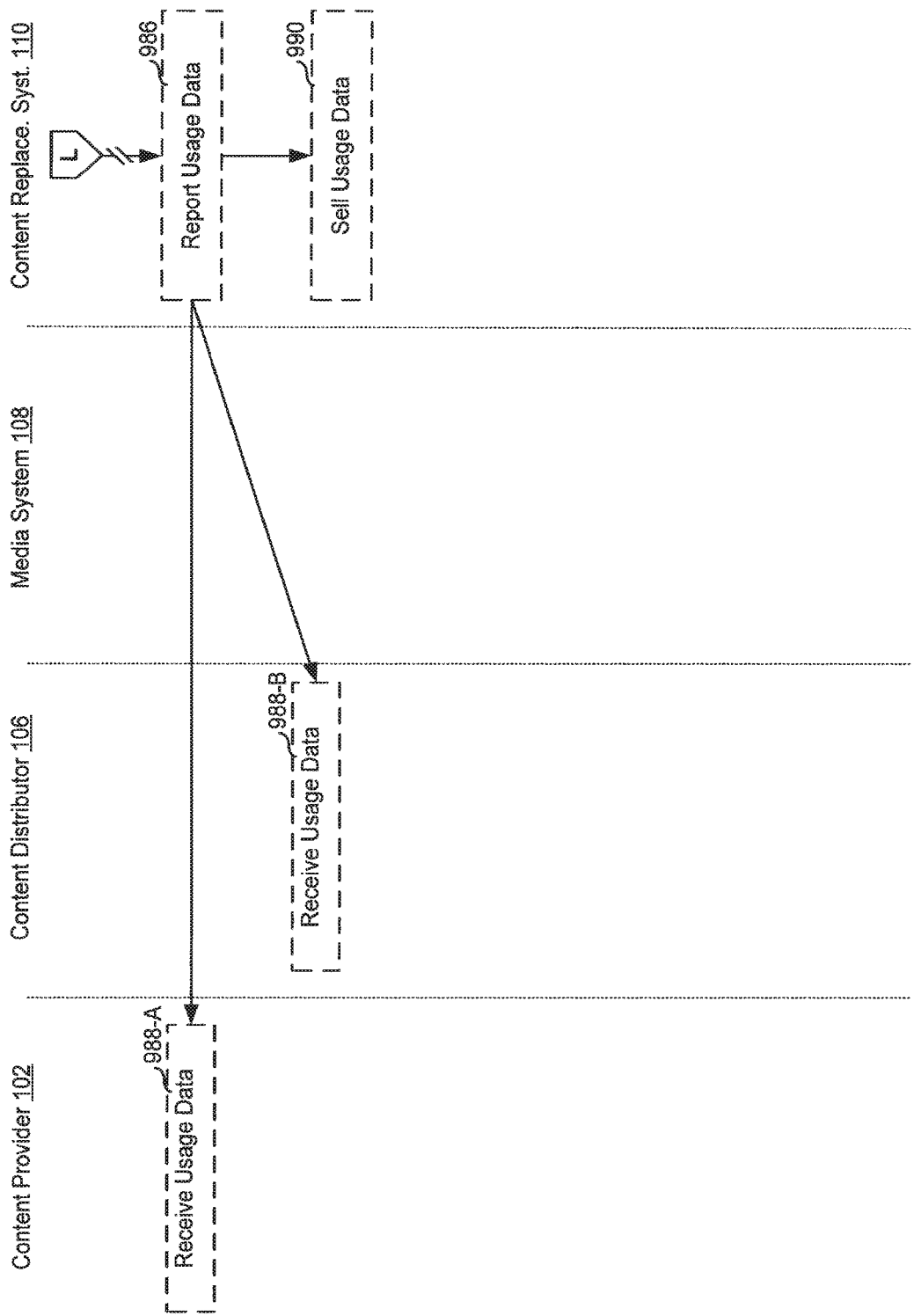

Attention is now directed towards FIG. 8, which illustrates the flow of data through a distributed system for distributing media content to a media device in accordance with some embodiments (e.g., embodiments where media content is replaced using fingerprint detection and matching). Some functional components, such as the network communication interfaces, have been omitted for clarity. Media content for presentation on a Media System 108 (e.g., television shows for display on a television) begins as source media content 236-A at the Content Provider 102. The source media content is retrieved from the media content database 236-A by one or more content streaming modules 226-A, which are controlled by the master control module 224-A to create a first sequence of media content by combining several sequences of media content into the first sequence of media content and/or inserting interstitial sequences of media content into a single sequence of media content. In some embodiments the first sequence of media content is created using a content switching module 228-A.

In accordance with some embodiments the media content from the content streaming module and the content switching module is uncompressed (e.g., unencoded) media content. The uncompressed media content is passed to a fingerprint generator module 229-A from the content streaming module 226-A or the content switching module 228-A. The fingerprint generator module 229-A generates fingerprints based on the media content and stores fingerprint data 238-A. In some embodiments, at least a subset of the fingerprint data 238-A is sent to the Content Replacement System 110.

In some embodiments the fingerprints are based on luminance sampling techniques. In one embodiment, luminance sampling includes identifying the luminance of one or more predefined blocks in predefined positions in a video frame. In some embodiments, a block is a subset of the pixels in a frame (e.g., an 8×8 grid of contiguous pixels). The luminance of these predefined blocks are compared to the luminance of the predefined blocks in a reference video frame, and if the relative luminance of the blocks in the video frame is within a predefined threshold of the luminance of corresponding blocks in the reference video frame, the video frame fingerprints match. In other embodiments, the luminance sampling includes determining the change in the luminance of one or more visual block in predefined positions over a sequence of video frames. Similarly, for this form of luminance fingerprinting, when the changes in luminance of the blocks in the sequence of frames match the changes in luminance in corresponding blocks in a reference sequence of frames within a predefined threshold, the video fingerprints match. While the foregoing embodiments have been described particularly with respect to luminance sampling fingerprinting, it should be understood that any other video fingerprinting technique could be used without departing from the presently claimed invention.

In some embodiments, after the fingerprints have been generated, or (optionally) while the fingerprints are concurrently being generated, the sequence of media content is encoded in an encoding module 231 into a format suitable for delivery to the Content Distributor 106 (e.g., using an audio and/or video encoding module to produce a profile of MPEG 2 or H.264 that is compatible with the transmission requirements of a given Content Distributor 106).

Take, for example, a television network creating a sequence of media content for a television channel. The sequence of media content includes 45 minutes of a television show and thirty half minute advertisements. The advertisements and the television show are stored in the media content database 236-A and are streamed through the content streaming module. The master control module 224-A instructs the content streaming module 226 which media content to stream and (optionally) uses the content switching module 228 to switch between advertisements and the television show. After the media content has been assembled into a sequence of media content, but before the content has been encoded, fingerprints of the unencoded media content are created (e.g., at predefined intervals such as every 5 seconds).

The Content Distributor 106 receives the sequence of media content from the Content Provider 102 and integrates the sequence of media content into a distribution medium such as a cable network, satellite network, IPTV network, web network, local radio frequency broadcast, mobile network, etc. In some embodiments, the Content Distributor 106 decodes an encoded sequence of media content from the Content Provider 102. When the Content Distributor 106 is configured to insert additional content (e.g., local advertisements), the Content Distributor 106 has a content streaming module 226-B for inserting media content 236-B (e.g., replacement geographically specific advertisements) into the sequence of media content, as directed by a master control module 224-B. In some embodiments, the Content Distributor 106 also has a fingerprint generator module 229-B for generating fingerprints from sequence of media content and stores fingerprint data 238-A. In some embodiments, at least a subset of the fingerprint data 238-B is sent to the Content Replacement System 110. In some embodiments, after adding any replacement media content to the sequence of media content the Content Distributor 106 encodes the sequence of media content using an encoder 231 into a format suitable for distribution to the Media System 108. When there are a plurality of sequences of media content, the Content Distributor 106 multiplexes a plurality of sequences of media content using multiplexer module 232 before passing the sequences of media content off to the Media System 108.

In accordance with some embodiments, the sequence(s) of media content is passed off to the Media System 108 through a communication network associated with the Content Distributor 106 (e.g., a cable network or a satellite network). In some embodiments the sequence of media content is passed to the Media System 108 along with a plurality of other sequences of media content, and the plurality of sequences of media content pass through a channel selector module 336, which selects a single sequence of media content to deliver to the Media System 108 in accordance with instructions received from the Media System 108. In some embodiments the channel selector module 336 is at the Media System 108 (as shown in FIG. 3) and the plurality of sequences of media content are passed to the channel selector module in the Media System 108.

At the Media System 108 the, sequence(s) of media content are passed to a multi-format demultiplexer 324/decoder 326, which demultiplexes (if necessary) and decodes the selected sequence of media content (e.g., decodes an encoded video stream from one or more of MPEG2, H.264, VC1, Quicktime, or other video format). The demultiplexed and decoded sequence of media content is passed to a fingerprint generator module 331 in the Media System 108, which analyzes the content to generate fingerprints. Once fingerprints have been generated, they are passed to a fingerprint matching module which compares the generated fingerprints with fingerprint data 334 received from the Content Replacement System 110. The fingerprint matching module communicates with the content replacement manager 430 in the Content Replacement System 110 to request replacement media content based on the generated fingerprint(s). In some embodiments, the fingerprint matching module 431 in the Content Replacement System 110 performs additional steps to identify the media content associated with the fingerprint received from the Media System 108, including comparing the received fingerprint to fingerprint data 446 stored in the Content Replacement System 110. In some embodiments the fingerprint data 446 includes only the fingerprint data received from the Content Provider 102 and the Content Distributor 106. In some embodiments the fingerprint data also includes fingerprints and associated data generated by a fingerprint generator module 429 at the Content Replacement System 110. The process for identifying media content associated with a fingerprint is discussed in greater detail below with reference to FIGS. 9A-9F.

Once the content associated with the received fingerprint has been identified, the replacement content manager 430 passes information associated with the identified media content (e.g., an advertiser identifier, an advertisement campaign identifier, advertisement duration, advertisement preroll period or advertisement start time) to the replacement content selector 424, which selects appropriate replacement media content from the replacement content database 440 based on the information provided by the replacement content manager 430 about the parameters of the sequence of media content (e.g., the length of the advertisement to be replaced, the advertising campaign, etc.) and (optionally) data about the Media System 108 that is sent from the Media System 108 or stored on the Content Replacement System 110. The Content Replacement System 110 sends replacement media content to the decoder 326 in the Media System 108.

In some embodiments the replacement media content arrives at the demultiplexer 324/decoder 326 in MPEG2 transport streams, in MP4 containers, or some other type of transport. Additionally, said replacement media content may arrive at the demultiplexer 324/decoder 326 in MPEG2, H.264, VC1, Quicktime, or other video format. In some embodiments, the replacement media content is streamed over a network connection (e.g., the internet) and the multi-format demultiplexer 324/decoder 326 has attached storage to buffer the some portion of the beginning of the replacement sequence of media and any related information, mitigating the effects of jitter introduced through streaming over the internet.

The decoder 326 decodes the replacement media content and passes the decoded replacement media content to the content selector 334, which switches over from the original sequence of media content to the replacement media content at a time that is, in accordance with some embodiments, determined in accordance with the identified media content associated with the fingerprint (e.g., the switch synchronizes the timing of the cutover from the chosen television channel to the targeted advertisement being delivered over the Internet from the Content Replacement System 110). The output device 312 then presents the replacement media content. In some embodiments, while the sequence of media content is being presented on the output devices 312, the demultiplexer 324/decoder 326 continues to demultiplex and decode the original sequence of media content.

After the replacement media content has ended the content selector 334 automatically switches back to the original sequence of media content. In some embodiments the original sequence of media content continues to advance while the replacement media content is presented (e.g., it restarts at a later point in the sequence, such as by replacing one advertisement in the sequence with a targeted advertisement of the same length). In some embodiments the original sequence of media content does not continue to advance (e.g., it restarts at the point that it was when the replacement media content began to play, such as by inserting an advertisement into the middle of a movie without replacing any of the content of the movie, essentially pausing the movie while the advertisement is displayed).

At various points in this process the Media System 108 provides usage data to a usage data collector 436 in the Content Replacement System 110. For example, the content selector 334 informs the usage data collector 436 of the state changes at the content selector 334. Said state changes including information about the delivery of replacement media content (e.g., a targeted ads) to an output device 312 (e.g., a television). The usage data is stored in a usage data database 442 for later use by the Content Replacement System 110. For targeted advertisement, when the content selector 334 is located in the output device (e.g., a video switch in a television) usage data is more valuable than general "rating" data (e.g., "Nielsen Ratings") because it includes information about whether the television was turned on, and thus substantially increases the accuracy of determining whether the targeted advertisement was watched.

Attention is now directed towards FIGS. 9A-9F, which include a flowchart representing a method for remotely controlling a Media System 108 (e.g., a consumer electronic device), according to certain embodiments. This method may be governed by instructions that are stored in a computer readable storage medium and that are executed by one or more processors of one or more computer systems. Each of the operations shown in FIGS. 9A-9F may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

In accordance with one embodiment, the Content Provider 102 and the Content Replacement System 110 perform a series of operations (901-A) and (901-B), including in some embodiments, receiving instructions from a Replacement Content Provider 112 (e.g., receiving instructions from an advertiser indicating the circumstances under which advertisements in a television broadcast stream are to be replaced with targeted advertisements provided by the advertiser). As one example, a car manufacturer, purchases a half minute advertising placement opportunity with a Content Provider 102 (e.g., a television network) and pays a content replacement service to insert a targeted advertisement in the advertisement placement opportunity. The Content Replacement System 110 obtains (902) replacement media content (e.g., a targeted advertisement) from the Replacement Content Provider (112 in FIG. 1) and obtains (903) content replacement parameters from the Replacement Content Provider 112 that indicate when the replacement media content should be inserted into a sequence of media content. In some embodiments those parameters include the advertiser identifier, the advertising campaign identifier, a unique identifier of the device playing the advertisement and/or the starting time of the advertisement.

The Content Provider 102 obtains (904) source media content. In some embodiments, the Content Provider 102 obtains the source media content from a satellite link to a content source (e.g., a television studio). Typically, this data is processed at the Content Provider 102 into a form that lends itself to storage. Additionally, media content can be received from a content source by accessing the content source through a proprietary network or a public network such as the Internet. In some embodiments, a Content Distributor 106 physically delivers a storage medium containing a digital copy of a programming content to the Content Provider 102. In some embodiments, media content is acquired and processed for transmission to viewers in real time, and not first stored (e.g., a live satellite feed of a football game). In some embodiments acquiring and processing media content for transmission to viewers in real time includes buffering at least a portion of the content (e.g., transmitting the media content with an eight second delay to compensate for any variations in the rate at which the media content is being received by the Content Provider 102).

In accordance with some embodiments, the Content Provider 102 uses the source media content to create a first sequence of media content (906), such as a television show that includes a plurality of 30-second advertisements. After creating the first sequence of media content, the Content Provider 102 generates (908) fingerprint data including fingerprints of the first sequence of media content, and stores (909) the fingerprint data including the fingerprints and, optionally one or more of a time stamp, the channel, and the time until the next advertisement begins in the data structures at the Content Provider 102. The process for generating a fingerprint in accordance with some embodiments is described in more detail above with reference to FIG. 8. In some embodiments, the fingerprint data is sent to the Content Replacement System 110. The Content Provider 102 sends (910) the stream of media content to a Content Distributor 106 or, optionally, sends the stream of media content directly to a Media System 108.

The Content Distributor 106 receives (911) the first sequence of media content from the Content Provider 102 and, optionally, adds (912) media content to the first sequence of media content. For example, the Content Distributor 106 may be authorized to replace a subset of the advertisements in a television channel with local advertisements. In some embodiments, after adding any media content to the first sequence of media content, the Content Distributor 106 generates (914) fingerprint data including fingerprints of the first sequence of media content and stores (915) the fingerprint data including the fingerprints and, optionally, one or more of a time stamp, the channel, and the time until the next advertisement begins in the data structures at the Content Distributor 106. The process for generating a fingerprint in accordance with some embodiments is described in more detail above with reference to FIG. 8.

It should be understood that, in some embodiments, only the Content Provider 102 generates fingerprints of the first sequence of media content, while in other embodiments, only the Content Distributor 106 generates fingerprints of the first sequence of media content. Additionally, in some embodiments, both the Content Distributor 106 and the Content Provider 102 generate fingerprints of the first sequence of media content. (For example, both a television network and a cable company have a relationship with a targeted advertiser and the television network and the cable company each generate fingerprints of the video feed/stream so as to enable particular positions within the sequence of media content to be identified so that both the Content Provider 102 and the content distributor are able to identify one or more advertisements in the same television feed for replacement with a targeted advertisement).

In some embodiments, the fingerprint data generated by the Content Provider 102 and the Content Distributor 106 are sent to the Content Replacement System 110, which stores (916) the fingerprint data. In some embodiments, the Content Replacement System 110 generates (917) its own fingerprints and stores the fingerprints and, optionally, one or more of a time stamp, the channel, and the time until the next advertisement begins in the data structures at the Content Distributor 106.

It should be understood that typically the Content Provider 102 and the Content Distributor 106 generate the fingerprint data, because the Content Distributor 106 and the Content Provider 102 have access to the first sequence of content before it is broadcast to the Media System 108 and thus can generate the fingerprint data so that it can be used by the Media System 108 to identify replaceable media content in the first sequence of media content and insert the replacement media content. However, when the Content Replacement System 110 has access to the content before it is displayed to the end-user (e.g., if the Content Replacement System 110 coordinates with the Media System 108 to introduce a 5 minute delay in the presentation of the first sequence of media content after it is received by both the Media System 108 and the Content Replacement System 110), then the Content Replacement System 110 can generate the fingerprint data that is used by the Media System 108, as described in greater detail below.

In some embodiments, fingerprint data is sent (918) to a Media System 108 from the Content Replacement System 110. In some embodiments, the fingerprint data includes all of the fingerprint data stored at the Content Replacement System 110. In some embodiments, the Content Replacement System 110 selects (919) a subset of the data based on usage history of the Media System 108. For example, if the Content Replacement System 110 has fingerprint data associated with one hundred television channels, and usage data for a particular Media System 108 indicates that the particular Media System 108 is only regularly used to watch ten of those channels, then the Content Replacement System 110 selects the subset of the fingerprint data that includes the fingerprint data associated with those ten channels and only sends the fingerprint data associated with those ten channels. In this example, by sending only a subset of the fingerprint data, the amount of data that is transmitted to the Media System 108 (and consequently the amount of bandwidth used to transmit that data) is reduced by approximately ninety percent. Similarly, sending only a subset of the fingerprint data reduces the use of storage space at the Media System 108. The Media System 108 receives (920) the fingerprint data from the Content Replacement System 110 and stores the fingerprint data (921) in local data structures for use in identifying sequences of media content and requesting replacement media content, as described in greater detail below.

The Content Distributor 106 prepares (922) the media content for delivery to a Media System 108. In some embodiments the Media System 108 sends a request indicating the selection (924) of a first sequence of media content (e.g., a first television channel). In this embodiment, the Content Distributor 106 delivers (926) the first sequence of media content to the Media System 108. The first sequence of media content is decoded (928) and presented (938) by the Media System 108. For example, in a switched digital video system, the end-user requests to view channel "42" of a plurality of cable channels, the request goes out over the communications network and a single channel is returned to the end-user and decoded on the end-user's home equipment (e.g., a cable box and a television). In some embodiments the decoder reports usage data to a Content Replacement System 110, this reporting may occur over an alternate communication network (e.g., a second communication network). The Content Replacement System 110 stores (930-A) the usage data, as described in greater detail below.

In some embodiments, the first sequence of media content is a sequence of video content including video content requested by the end-user and advertisement video content. In some embodiments, the replacement media content is a sequence of video content including one or more replacement advertisements.

In some embodiments, the end-user does not send a network request for a first sequence of media content, but rather the Content Distributor 106 delivers (932) a plurality of sequences of media content (e.g., multiplexed television channels). The Media System 108 receives the plurality of sequences of media content (e.g., multiple television channels) and the end-user selects (934) a first sequence of the media content. In some embodiments, the Media System 108 demultiplexes the plurality of sequences of media content and decodes (936) the selected first sequence of media content. In some embodiments usage data is sent by the Media System 108 to the Content Replacement System 110 and stored (930-B) for later use.

In some embodiments, the Media System 108 receives the first sequence of media content from a media Content Distributor 106 over a first communication network (e.g., a managed content distribution network such as a cable network or a satellite network), where fingerprint data has been generated the first sequence of media content in order to facilitate the replacement of media content in the first sequence of media content with replacement media content. The Media System 108 presents (938) the first sequence of media content to an end-user of the Media System 108. While presenting the first sequence of media content to the end-user, the Media System 108 generates (939) a fingerprint of the first sequence of media content. In some embodiments, the fingerprint is generated before the first sequence is actually displayed to the end-user, so that the first sequence of media content can be replaced with replacement media content before it is displayed to the end-user.

In some embodiments, the Media System 108 sends (940) a request to the Content Replacement System 110 for replacement media content including the fingerprint. For example, in embodiments where the Content Replacement System 110 does not send any fingerprint data to the Media System 108, the Media System 108 must send the fingerprint to the Content Replacement System 110, and then the fingerprint is compared (942) with reference fingerprints at the Content Replacement System 110. If a matching fingerprint is not found (944), then the process ends (945). If a matching fingerprint is found (946), and the first sequence of media content is identified by the Content Replacement System 110, then the Content Replacement System 110 proceeds to select replacement media content, as described in greater detail below. In accordance with some embodiments, the Media System 108 stores (930-C) usage data and/or sends the usage data to a Content Replacement System 110 for later use.

In embodiments where the network connection is asymmetrical so that the Media System 108 has a much higher download bandwidth than upload bandwidth, it is beneficial for the Content Replacement System 110 to send fingerprints to the Media System 108 and have some of the matching of fingerprints take place at the Media System 108, instead of having the Media System 108 repeatedly sending fingerprint data to the Content Replacement System 110 for matching. This arrangement is beneficial, because sending the fingerprint data to the Media System 108 uses the relatively unlimited download bandwidth rather than the relatively limited upload bandwidth of the Media System 108. Thus, in some embodiments, it is advantageous to store at least a subset of reference fingerprint data including reference finger prints at the Media System 108, where the reference fingerprint data is predetermined fingerprint data (e.g., data originally generated by the Content Replacement System 110, the content provider and/or the Content Distributor 106). The Media System 108 compares (948) the generated fingerprint to the reference fingerprints in the subset of reference fingerprint data received from the Content Replacement System 110. If a match is not found (950), then the Media System 108 sends (951) a request for replacement media content, the request including the generated fingerprint. As an illustrative example, when the Content Replacement System 110 only sends fingerprint data to the Media System 108 including fingerprints for the ten most frequently watched television channels, if the Media System 108 is currently displaying a sequence of media content for a television channel that is not one of the ten most frequently watched television channels, the Media System 108 will not have predetermined fingerprint data that matches the sequence of media content and will have to send the generated fingerprint to the Content Replacement System 110 for comparison with the entire set of reference fingerprints stored at the Content Replacement System 110.

In this embodiment, the fingerprint is received at the Content Replacement System 110 and is compared (942) with additional reference fingerprints at the Content Replacement System 110. If a matching fingerprint is not found (944), then the process ends (945). If a matching fingerprint is found (946), thereby identifying the first sequence of media content, then the Content Replacement System 110 proceeds to select replacement media content, as described in greater detail below.

In contrast, if a match to the generated fingerprint is found (952), thereby identifying the first sequence of media content, the Media System 108 sends (953) a request for replacement media content to the Content Replacement System 110, the request including data indicating that the fingerprint matches a reference fingerprint in the subset of reference fingerprint data. For example, if the first sequence of media content that is being received by the Media System 108 is one of the ten most frequently watched television channels, and the Media System 108 identifies a reference fingerprint identifying the channel and the current time of the channel. In this example, the request to the Media System 108 includes an identifier of the channel and a timestamp of the channel and sends a request to the Content Replacement System 110 requesting any replacement media content (e.g., targeted advertisements) for the identified channel.

In some embodiments the request includes an authentication message. A number of different authentication techniques may be used (e.g., Kerberos, RSA, etc.), some of which involve multiple communications between the Media System 108 and the Content Replacement System 110. If the authentication is not valid, then the process ends, and no replacement media content is sent to the Media System 108. If the authentication message is valid and the Content Replacement System 110 is able to authenticate the request, then the content replacement selects replacement media content in accordance with predefined criteria. An exemplary authentication process is described in greater detail above with reference to FIG. 6C. One having ordinary skill in the art would readily understand that any authentication process or procedure known in the art could be used to authenticate communications between the Media System 108 and the Content Replacement System 110.

It should be noted that the media device does not request a particular replacement media content. Rather, the media device merely reports a particular fingerprint or fingerprint match (e.g., an identified first sequence of media content) to the Content Replacement System 110, and the Content Replacement System 110 uses the request from the media device (including one or more of a unique identifier of the media device, and fingerprint or fingerprint match) along with, in some embodiments, additional data stored at the Content Replacement System 110. The Content Replacement System 110 identifies (954) the first sequence of media content from the matched reference fingerprint (e.g., the Content Replacement System 110 determines that the first sequence of media content is a particular television channel). The Content Replacement System 110 also uses the matched reference fingerprint to determine (956) a reference position (e.g., a timestamp or number of frames from a content transition point) within the first sequence of media content. In this way the Content Replacement System 110 can make a sophisticated decision as to what replacement media content is the most suitable for the particular Media System 108 and for the particular content replacement opportunity.

The Content Replacement System 110 selects (958) replacement media content in accordance with predefined criteria. In some embodiments the predefined criteria is based (959) at least in part on the first sequence of media content. In some embodiments the predefined criteria is based (960) at least in part on the reference position within the media content. In some embodiments, the predefined criteria is based (961) at least in part on information about the end-user of the Media System 108 such, including replacement parameters provided by the Replacement Content Provider 112 (e.g., an advertiser). These parameters enable the Content Replacement System 110 to intelligently select replacement media content. In some embodiments the parameters indicate that the replacement of a portion of the first sequence of media content with replacement media content is authorized (e.g., that the replacement of a non-targeted advertisement with a targeted advertisement is authorized by the advertiser).

As one example of this method, the reference fingerprint is used by the Content Replacement System 110 to identify a sequence of media content (e.g., a television channel and/or a particular advertisement or television show within the television channel) and a timestamp within the sequence of media content (e.g., the location of the content that is to be replaced, such as a non-targeted advertisement). A particular position (e.g., a position relative to the reference position) within the identified first sequence of media content is associated with an advertisement identifier and/or an advertisement campaign identifier for the generic advertisement to be overwritten with a targeted replacement advertisement delivered by the Content Replacement System 110. In some embodiments, the parameters identify the specific targeted advertisement that may be inserted as a substitute for the generic advertisement. The advertisement identifier and the advertisement campaign identifier are used by the Content Replacement System 110 to select an advertisement that is authorized by the advertiser to overwrite the broadcast advertisement based on parameters provided by the Replacement Content Provider 112 (e.g., advertiser) and maintained in a database in the Content Replacement System 110.

Similarly, a request for replacement media content may include parameters that enable the Content Replacement System 110 to select advertisements that best match the technical limitations of the Media System 108. For example, such parameters may include: the video profile (e.g., SD, HD and resolution parameters) and the bandwidth (e.g., data rate) of the network connection. In a complementary implementation, these parameters inform the content replacement server to assist in formatting or transcoding the substitute advertisement video so it is technically compatible with the Media System 108.

In some embodiments, a request for replacement media content includes parameters that enable the Content Replacement System 110 to select advertisements that target the viewer based on program context. These parameters enable the Content Replacement System 110 to select advertisements that best match the interests of the viewer based on the characteristics of the content being viewed. Content characteristics can also be referred to as content properties or content metadata. Content metadata that would help the Content Replacement System 110 select an advertisement that targets a typical viewer of said content include the rating of the content and/or the genre of the content (e.g., Kids, Sports, Financial News, etc.) Content metadata can be obtained in many ways. One way to obtain content metadata is by extracting the metadata from guide listings data.

A request for replacement media content may also include parameters that enable the Content Replacement System 110 to select advertisements that target the viewer based on the viewer demographic, psychographic or behavioral information. These parameters enable the Content Replacement System 110 to select advertisements that best match the interests of the viewer based on the viewer's demographic information.

An example of demographic information is the media system location, such as a zip code. Media System 108 location information may be stored on the Media System 108 directly and can then be sent directly as a parameter in the request for replacement media content. In some cases, media system location information may not be stored on the Media System 108 directly however it can be determined at the back-end by mapping the Media System 108 host device identifier to the location in an account database or another database within which there is a mapping of the media system identifier to its owner's home address. One example of such a database is a product registration database populated at the Media System 108 purchase point or populated by way of a registration mechanism such as in the case of a warranty registration. In the case where media system location information is not stored directly on the Media System 108, a parameter in the request from the Media System 108 would include the identifier. The identifier would be used by a Content Replacement System 110 component as a key into a database at the back-end to resolve the media system location information. This location information would be used to select an advertisement that targets the derived location.

In some embodiments, additional information about the end-user of the Media System 108 is provided by one or more of: a Content Provider 102 (e.g., a Content Provider 102 knowing what premium stations the end-user has purchased), a Content Distributor 106 (e.g., a cable network having data about what channels the end-user watches); a manufacturer of the Media System 108 (e.g., information filled out on a warrantee card); and a service provider to the end-user of the Media System 108 (e.g., a cell phone provider having information about what area codes the end-user calls the most and what kind of cell phone the end-user owns). In some embodiments this user data (e.g., data about the end-user) may be stored in the Content Replacement System 110 and used by the Content Replacement System 110 to select replacement media content.

In some embodiments, before the replacement media content is used to replace the first sequence of media content at the Media System 108, the Content Replacement System 110 verifies that the first sequence of media content is the identified sequence of media content. In one embodiment, the fingerprints discussed above are weak fingerprints (i.e., fingerprints that include a relatively small amount of information, such as a fingerprint that is generated using two blocks of a single frame of the media content) that is not sufficient to uniquely identify the sequence of media content, but is sufficient to identify a likely candidate for the first sequence of media content when correlated with other available information (e.g., the approximate time that the fingerprint was processed). In this embodiment, after the sequence of media content has been preliminarily identified the Media System 108 generates a stronger fingerprint (i.e. a fingerprint that includes a relatively larger amount of information, such as a fingerprint generated using every block in a single frame of the media content) that is sufficient to uniquely identify the media sequence. This strong fingerprint is compared with a corresponding fingerprint for the identified sequence of media content. If the strong fingerprint matches, then the match is verified, and the replacement media content is sent to the Media System 108.

As an example of this embodiment, if the first sequence of media content is a television channel including a television program and a plurality of advertisements, the Media System 108 initially generates weak fingerprints, which are matched (either at the Media System 108 or at the Content Replacement System 110) with reference fingerprints to determine the current channel. The Content Replacement System 110 identifies a targeted advertisement that is going to be displayed on the channel as a replacement for a non-targeted advertisement. However, before the non-targeted advertisement is replaced, the Media System 108 generates a strong fingerprint of the identified advertisement (e.g., a fingerprint of the first frame of the advertisement) which is compared with a strong fingerprint of the first frame of the advertisement. In some embodiments the strong fingerprint is globally unique and is generated by sampling the luminance of every block in the first frame of the non-targeted advertisement and is compared with a corresponding reference fingerprint for the first frame of the non-targeted advertisement. In these embodiments, the advertisement is only replaced if the strong fingerprints match. Thus, the content is replaced only if the non-targeted advertisement is verified to be the replaceable advertisement using a strong fingerprint.

In some embodiments, weak fingerprints are used to continuously monitor a first sequence of media content to determine whether the first sequence of media content has ceased to be displayed (e.g., because the end-user switched channels). In this case, a very weak fingerprint may be used (e.g., the luminance of a single block every 10 video frames) which requires very little bandwidth to communicate with the Content Replacement System 110, but is sufficient to determine whether the sequence of media content has been changed (e.g., because the end-user has changed the video input from cable to a DVD player or because the end-user has changed channels.)

The Media System 108 receives (962) the replacement media content and decodes (964) the replacement media content. In accordance with some embodiments, the Content Replacement System 110 receives and stores (930-D) usage data from the decoder/multiplexer when the replacement media content is decoded.

After receiving and decoding the replacement media content, the Media System 108 determines (966) a position to begin presenting the replacement media content based on the reference position. As one example, the content to be replaced is an advertisement, and when the Media System 108 generates the fingerprint, the Media System 108 determines a frame of the fingerprint (e.g., the first frame that was analyzed to generate the fingerprint) and records this as part of the fingerprint data. When the sequence of media content is identified, the Content Replacement System 110 sends the Media System 108 replacement media content, where the replacement media content starts at a position relative to the fingerprint used to identify the sequence of media content (e.g., the position is "239 frames after the frame associated with the fingerprint"). The Media System 108 uses the stored fingerprint data about the location of the fingerprint and the information from the Content Replacement System 110 about the relative position of the fingerprint and an insertion point for the replacement media content to determine when to begin presenting the replacement media content at the Media System 108.

In accordance with some embodiments, after determining when to begin presenting the replacement media content, the Media System 108 begins presenting (968) the replacement media content instead of the first sequence of media content. In some embodiments, the replacement media content has an end, and the Media System 108 detects the end of the replacement media content and ceases to present the replacement media content and presents the first sequence of media content. In accordance with some embodiments, when the Media System 108 begins presenting the replacement media content, the Content Replacement System 110 receives and stores (930-E) usage data from the decoder/multiplexer.

As one example, an end-user is watching television channel "42," the television detects that a targeted advertisement spot is coming up in eight seconds. In response to generating a fingerprint and determining a matching reference fingerprint, thereby identifying the currently displayed television channel, the television requests targeted advertisement content from the Content Replacement System 110 over an internet connection (or sends the fingerprint to the Content Replacement System 110 so that the Content Replacement System 110 can make this determination). After verifying that the sequence of media content includes the replaceable content, the Content Replacement System 110 sends a targeted advertisement, which is selected based on known demographic information about the end-user or the television of the end-user (e.g., provided when the end-user purchased the television). The replacement media content is delivered to the end-user's television over the internet connection and is played on the television instead of the regular advertisement. When the targeted advertisement ends, the channel that the end-user was watching is redisplayed.

In accordance with some embodiments, receiving the first sequence of media content includes receiving it from a managed television network, such as a satellite network, radio frequency broadcast network, internet protocol television system or cable network, while accessing the replacement media content includes accessing an unmanaged IP network, such as the Internet, or an IP network managed by another, such as in a self-contained hotel network. In a related embodiment, the method may make use of a virtual second communication network where the second communication network differs from the first communication network on one or more of layers one through six of the Open Systems Interconnection (OSI) network layer stack. In other words, the second communication network can be a virtualized separate network.

In accordance with some embodiments, while presenting the replacement media content to the end-user, the Media System 108 receives (969) a request to select a second sequence of media content (e.g., to change from channel "42" to channel "10"). In some embodiments the Media System 108 sends a request to the Content Distributor 106 for the second sequence of media content, and the Content Distributor 106 delivers (970) sequence of media content that is, in accordance with some embodiments, being provided (971) by the Content Provider 102. The Media System 108 receives (972) the second sequence of media content, and presents (974) the second sequence of media content to the end-user. In some embodiments, the Content Distributor 106 is sending the Media System 108 a plurality of sequences of media content, and the Media System 108 merely demultiplexes and decodes the requested second sequence of media content. In either case, the Media System 108 ceases presenting the replacement media content; and, instead presents (974) the second sequence of media content to the end-user.

Thus, even though the Media System 108 has replaced the content and is no longer displaying the first sequence of media content (e.g., the first channel that the end-user was watching), the Media System 108 is still able to detect and respond to a request of the end-user to change the sequence of media content. For example, the end-user is watching channel "42," an advertisement is replaced with a targeted advertisement. Before the targeted advertisement is finished, the end-user switches to channel "10." In response, instead of continuing to display the targeted advertisement, the television switches to the new channel (e.g., channel "10").

In some embodiments, while presenting the second sequence of media content to the end-user, the media device continues to advance the replacement media content (e.g., the targeted advertisement continues to advance). In some embodiments, the end-user selects the first sequence of media content after having previously selected the second set of media content, (e.g., the end-user switches back from channel "10" to channel "42"). The media device receives a request (978) for the first sequence of media content; and in response to the request for the first sequence of media content, if the request was (980) made within a predefined time (e.g., the length of the replacement media content, so that the replacement media content is still advancing), the Media System 108 finishes presenting (982) the replacement media content. However, if the replacement media content if the request was not (984) made within a predefined time (e.g., the length of the replacement media content, so that the replacement media content has ended), the Media System 108 resumes presenting (938) the first sequence of media content to the end-user. In accordance with some embodiments, when the Media System 108 resumes presenting the replacement media content, the Content Replacement System 110 receives and stores (930-F) usage data from the decoder/multiplexer.

Similarly, in another embodiment, while the replacement subset of media content is being sent to the viewer display, the Media System 108 continues to monitor the first sequence of media content for changes in the characteristics of the sequence, such as changes in volume, changes in channels, invocation of Emergency Alert System (EAS), invocation of an on-screen program guide, etc., and is responsive to such changes by either switching back to the first sequence of media content (e.g., television stream) from the replacement media content (e.g., targeted advertisement stream), or makes changes in characteristics of the replacement media content (e.g., targeted advertisement stream) received over the alternate distribute network to mirror changes in the monitored first sequence of media content (e.g., original television stream) to the replacement media content.

In some embodiments, the Content Replacement System 110 sends (986) the stored usage data to the Content Provider 102 and/or the Content Distributor 106. The Content Provider 102 and the Content Distributor 106 receive (988-A, 988-B) the usage data and may use that data to improve their advertising strategies. In some embodiments, the Content Replacement System 110 stores the usage data and sells (990) the usage data.

The foregoing description, for purpose of explanation, has been described with reference to specific embodiments. However, the illustrative discussions above are not intended to be exhaustive or to limit the disclosed system and method to the precise forms disclosed. Many modifications and variations are possible in view of the above teachings. The embodiments were chosen and described in order to best explain the principles of the disclosed system and method and its practical applications, to thereby enable others skilled in the art to best utilize the disclosed system and method and various embodiments with various modifications as are suited to the particular use contemplated.

The invention claimed is:

1. A method comprising:
  accessing, by one or more processors of a media system operatively connected to a speaker device, a sequence of media content, wherein the sequence of media content is outputted by the speaker device of the media system;
  accessing a fingerprint of a first portion of the sequence of media content;
  comparing the fingerprint with a plurality of reference fingerprints stored in a database;
  based on the comparison, identifying the sequence of media content and determining a position of the first portion within the sequence of media content;
  accessing replacement media content at the media system, wherein the replacement media content is selected based at least in part on the identified sequence of media content;

determining, by the one or more processors, an offset position in the sequence of media content relative to the position of the first portion, the offset position corresponding to a second portion of the sequence of media content; and
causing the replacement media content to be outputted by the speaker device of the media system beginning at the determined offset position.

2. The method of claim 1, further comprising sending a request for the replacement media content.

3. The method of claim 1, further comprising generating, via one or more processors of the media system, the fingerprint of the first portion.

4. The method of claim 1, further comprising, prior to causing the replacement media content to be outputted by the speaker device:
accessing a fingerprint generated by the media system from the second portion of the sequence of media content;
comparing the generated fingerprint with a reference fingerprint for the second portion of the sequence of media content; and
determining that the accessed fingerprint matches the reference fingerprint for the second portion,
wherein causing the replacement media content to be outputted by the speaker device is responsive to the determining that the accessed fingerprint matches the reference fingerprint.

5. The method of claim 1, further comprising, while causing the replacement media content to be outputted by the speaker device, monitoring the sequence of media content.

6. The method of claim 5, wherein the monitoring of the sequence of media content comprises monitoring at least one characteristic of the sequence selected from the group consisting of: a volume of the sequence of media content, a change of channel, an invocation of an emergency alert system, and an invocation of an on-screen program guide.

7. The method of claim 1, wherein the media content consists essentially of an audio signal.

8. The method of claim 7, wherein the media content comprises a radio signal.

9. The method of claim 1, wherein the sequence of media content is received via a first communication network and the replacement media content is received via a second communication network.

10. A media system comprising:
a memory that stores instructions; and
one or more processors configured by the instructions to perform operations comprising:
accessing a sequence of media content, wherein the sequence of media content is outputted by a speaker device;
accessing a fingerprint of a first portion of the sequence of media content;
comparing the fingerprint with a plurality of reference fingerprints stored in a database;
based on the comparison, identifying the sequence of media content and determining a position of the first portion within the sequence of media content;
accessing replacement media content at the media system, wherein the replacement media content is selected based at least in part on the identified sequence of media content;
determining an offset position in the sequence of media content relative to the position of the first portion, the offset position corresponding to a second portion of the sequence of media content; and
causing the replacement media content to be outputted by the speaker device beginning at the determined offset position.

11. The media system of claim 10, wherein the operations further comprise sending a request for the replacement media content.

12. The media system of claim 10, wherein the operations further comprise generating the fingerprint of the first portion.

13. The media system of claim 10, wherein the operations further comprise, prior to causing the replacement media content to be outputted by the speaker device:
accessing a fingerprint generated by the media system from the second portion of the sequence of media content;
comparing the generated fingerprint with a reference fingerprint for the second portion of the sequence of media content; and
determining that the accessed fingerprint matches the reference fingerprint for the second portion,
wherein causing the replacement media content to be outputted by the speaker device is responsive to the determining that the accessed fingerprint matches the reference fingerprint.

14. The media system of claim 10, wherein the media content consists essentially of an audio signal.

15. The media system of claim 14, wherein the media content comprises a radio signal.

16. The media system of claim 10, wherein the operations further comprise:
while causing the replacement media content to be outputted by the speaker device, monitoring the sequence of media content.

17. The media system of claim 16, wherein the monitoring of the sequence of media content comprises monitoring at least one characteristic of the sequence selected from the group consisting of: a volume of the sequence of media content, a change of channel, an invocation of an emergency alert system, and an invocation of an on-screen program guide.

18. The media system of claim 10, wherein the sequence of media content is received via a first communication network and the replacement media content is received via a second communication network.

19. A non-transitory machine-readable medium that stores instructions, which, when executed by one or more processors of a media system, cause the media system to perform operations comprising:
accessing a sequence of media content, wherein the sequence of media content is outputted by a speaker device;
accessing a fingerprint of a first portion of the sequence of media content;
comparing the fingerprint with a plurality of reference fingerprints stored in a database;
based on the comparison, identifying the sequence of media content and determining a position of the first portion within the sequence of media content;
accessing replacement media content at the media system, wherein the replacement media content is selected based at least in part on the identified sequence of media content;
determining an offset position in the sequence of media content relative to the position of the first portion, the offset position corresponding to a second portion of the sequence of media content; and causing the replacement media content to be outputted by the speaker device beginning at the determined offset position.

20. The non-transitory machine-readable medium of claim 19, wherein the operations further comprise:

sending a request for the replacement media content.

* * * * *